United States Patent
Johnson et al.

(10) Patent No.: US 9,932,871 B2
(45) Date of Patent: Apr. 3, 2018

(54) VARIABLE GEOMETRY EXHAUST CONDUIT

(71) Applicant: Cummins Emission Solutions Inc., Columbus, IN (US)

(72) Inventors: Samuel Johnson, Bloomington, IN (US); Mihai Chiruta, Madison, WI (US); John G. Buechler, Indianapolis, IN (US); Matthew K. Volmerding, Columbus, IN (US); Andrew J. Albers, Columbus, CO (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 14/918,260

(22) Filed: Oct. 20, 2015

(65) Prior Publication Data

US 2017/0107877 A1    Apr. 20, 2017

(51) Int. Cl.
*F01N 3/02*    (2006.01)
*F01N 3/20*    (2006.01)
(Continued)

(52) U.S. Cl.
CPC ......... *F01N 3/2066* (2013.01); *F01N 3/2892* (2013.01); *F01N 9/00* (2013.01);
(Continued)

(58) Field of Classification Search
CPC .............. F01N 2/2066; F01N 2610/02; F01N 2240/20; F01N 2610/14; F01N 3/2892; F01N 2610/1493; F01N 2900/1411
(Continued)

(56) References Cited

U.S. PATENT DOCUMENTS

| 4,864,825 A | 9/1989 | Kakuta |
| 5,355,673 A * | 10/1994 | Sterling ................ F01N 13/082 137/527 |

(Continued)

FOREIGN PATENT DOCUMENTS

| JP | 2013231364 A | * 11/2013 |
| KR | 2007/0027045 | 3/2007 |

OTHER PUBLICATIONS

JP 2013231364, Machine Translation, Provided Dec. 10, 2016.*
International Search Report and Written Opinion issued for PCT/US2016/054825, dated Dec. 20, 2016, 16 pages.

*Primary Examiner* — Patrick Maines
(74) *Attorney, Agent, or Firm* — Foley & Lardner LLP

(57) ABSTRACT

A method for reducing reductant deposits in an exhaust conduit fluidly coupled to an engine comprises operating the engine to produce an exhaust gas. The exhaust gas is communicated into the exhaust conduit which has an initial cross-sectional area. An initial flow rate corresponding to an initial flow velocity of the exhaust gas entering the exhaust conduit is determined. The initial flow rate and, thereby the initial flow velocity of the exhaust gas, increases or decreases based on an operating condition of the engine. The initial flow rate of the exhaust gas is compared with a predetermined threshold. If the initial flow rate of the exhaust gas is lower than the predetermined threshold, a cross-sectional area of the exhaust conduit is reduced. The reducing of the cross-sectional area causes the exhaust gas to have an adjusted flow velocity greater than the initial flow velocity.

25 Claims, 12 Drawing Sheets

(51) Int. Cl.
*F01N 3/28* (2006.01)
*F01N 9/00* (2006.01)

(52) U.S. Cl.
CPC ...... *F01N 2240/36* (2013.01); *F01N 2410/00* (2013.01); *F01N 2470/24* (2013.01); *F01N 2560/07* (2013.01); *F01N 2610/02* (2013.01); *F01N 2610/1453* (2013.01)

(58) Field of Classification Search
USPC .......................................................... 60/295
See application file for complete search history.

(56) References Cited

U.S. PATENT DOCUMENTS

| | | | | |
|---|---|---|---|---|
| 5,603,214 | A * | 2/1997 | Abels | F01N 1/16 239/571 |
| 5,675,969 | A * | 10/1997 | Satoh | F02D 9/06 123/323 |
| 6,173,568 | B1 | 1/2001 | Zurbig et al. | |
| 6,905,658 | B2 | 6/2005 | Rogers et al. | |
| 2003/0000582 | A1 * | 1/2003 | Jackson | F16K 15/033 137/527.6 |
| 2003/0175175 | A1 | 9/2003 | Shishido et al. | |
| 2006/0260868 | A1 * | 11/2006 | Suzuki | F01N 1/165 181/237 |
| 2007/0209361 | A1 * | 9/2007 | Pedersen | F01D 9/026 60/602 |
| 2009/0031717 | A1 | 2/2009 | Blaisdell | |
| 2009/0044524 | A1 | 2/2009 | Fujino | |
| 2010/0005791 | A1 * | 1/2010 | Ranganathan | F01N 3/36 60/310 |
| 2010/0071352 | A1 * | 3/2010 | Tatur | B01F 3/02 60/287 |
| 2013/0061577 | A1 * | 3/2013 | Floyd | F01N 3/2066 60/295 |
| 2013/0199371 | A1 | 8/2013 | Gyuro et al. | |
| 2015/0101313 | A1 * | 4/2015 | Mitchell | F01N 3/28 60/274 |
| 2015/0355080 | A1 * | 12/2015 | Mitchell | G01N 21/3504 356/73 |
| 2015/0361849 | A1 * | 12/2015 | Chiruta | F01N 3/2892 60/301 |
| 2016/0076420 | A1 * | 3/2016 | Myer | F01N 3/208 423/212 |

* cited by examiner

VARIABLE GEOMETRY EXHAUST CONDUIT

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) system which includes a catalyst formulated to convert NOx (NO and $NO_2$ in some fraction) into harmless nitrogen gas ($N_2$) and water vapor ($H_2O$) in the presence of ammonia ($NH_3$). A reductant is often inserted into exhaust conduits communicating the exhaust gas to the SCR system and/or other components of the aftertreatment system. The reductant can crystallize and deposit on the sidewalls of the exhaust conduit and/or the components of the aftertreatment system causing an increase in backpressure, clogging of the aftertreatment components, reduce a catalytic conversion efficiency of the SCR system and increase maintenance costs.

SUMMARY

Embodiments described herein relate generally to systems and methods of controlling flow velocity of an exhaust gas through an exhaust conduit of an aftertreatment system, and in particular to systems and methods for adjusting a cross-sectional area of an exhaust conduit of an aftertreatment system to adjust the flow velocity of the exhaust gas flowing through the exhaust conduit.

In a first set of embodiments, a method for reducing reductant deposits in an exhaust conduit fluidly coupled to an engine comprises operating the engine to produce an exhaust gas. The exhaust gas is communicated into the exhaust conduit which has an initial cross-sectional area. An initial flow rate of the exhaust gas entering the exhaust conduit is determined. The initial flow rate corresponds to an initial flow velocity of the exhaust gas entering the exhaust conduit. The initial flow rate and, thereby the initial flow velocity of the exhaust gas, increases or decreases based on an operating condition of the engine. The initial flow rate of the exhaust gas is compared with a predetermined threshold. If the initial flow velocity of the exhaust gas is lower than the predetermined threshold, a cross-sectional area of the exhaust conduit is reduced. The reducing of the cross-sectional area causes the exhaust gas to have an adjusted flow velocity greater than the initial flow velocity.

In a second set of embodiments, an aftertreatment system comprises a SCR system configured to decompose constituents of an exhaust gas generated by an engine. An exhaust conduit is fluidly coupled to the engine and the SCR system. The exhaust conduit defines a cross-sectional area. The exhaust conduit is structured to receive the exhaust gas at an initial flow rate. The initial flow rate corresponds to an initial flow velocity of the exhaust gas entering the exhaust conduit. The initial flow rate, and thereby the initial flow velocity of the exhaust gas, increases or decreases based on an operating condition of the engine. A cross-section adjusting means is operatively coupled to the exhaust conduit. The cross-section adjusting means is configured to increase or decrease the cross-sectional area of the exhaust conduit in response to the initial flow rate of the exhaust conduit. The increase or decrease of the cross-sectional area changes the initial flow velocity to an adjusted flow velocity different from the initial flow velocity. A reductant insertion assembly is fluidly coupled to the exhaust conduit. The reductant insertion assembly is configured to selectively insert a reductant into the exhaust conduit.

In a third set of embodiments, an apparatus for delivering an exhaust gas generated by an engine to an aftertreatment component comprises an exhaust conduit configured to be fluidly coupled to the engine and the aftertreatment component. A plurality of channels are defined within the exhaust conduit. Each of the plurality of channels are structured to allow at least a portion of the exhaust gas to pass therethrough. An initial cross-sectional area of the exhaust conduit corresponds to a sum of the cross-sectional area of each of the plurality of channels. The exhaust conduit is structured to receive the exhaust gas at an initial flow rate. The initial flow rate corresponds to an initial flow velocity of the exhaust gas entering the exhaust conduit. The initial flow rate and, thereby the initial flow velocity of the exhaust gas, increases or decreases based on an operating condition of the engine. A flow rate sensor is positioned proximate to an inlet of the exhaust conduit. At least one valve is positioned at an inlet of at least one of the plurality of channels. A controller is communicatively coupled to the flow rate sensor and the at least one valve. The controller is configured to interpret an output signal from the flow rate sensor. The output signal is indicative of the initial flow rate of the exhaust gas. If the initial flow rate is lower than the predetermined threshold, the controller instructs the at least one valve to move into a closed position to close an inlet of at least one of the plurality of channels. The closing of the at least one valve causes the exhaust gas to flow through only a portion of the plurality of channels so that the exhaust conduit has a reduced cross-sectional area corresponding to a sum of the cross-sectional areas of the portion of the plurality of channels.

In a fourth set of embodiments, a control circuitry comprises a controller configured to be communicatively coupled to flow velocity sensor positioned proximate to an inlet of an exhaust conduit fluidly coupled to an engine to receive an exhaust gas therefrom. The controller is also communicatively coupled to a cross-section adjusting mechanism configured to increase or decrease a cross-sectional area of the exhaust conduit. The controller comprises a flow rate sensing circuitry configured to interpret an output signal from the flow rate sensor. The output signal is indicative of the initial flow rate of the exhaust gas. The initial flow rate corresponds to an initial flow velocity of the exhaust gas entering the exhaust conduit. A cross-section adjusting circuitry is configured to instruct the cross-section adjusting mechanism to increase or decrease the cross-sectional area of the exhaust conduit based on the initial flow rate of the exhaust gas. The increase or decrease of the cross-sectional area changes the initial flow velocity to an adjusted flow velocity different from the initial flow velocity.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
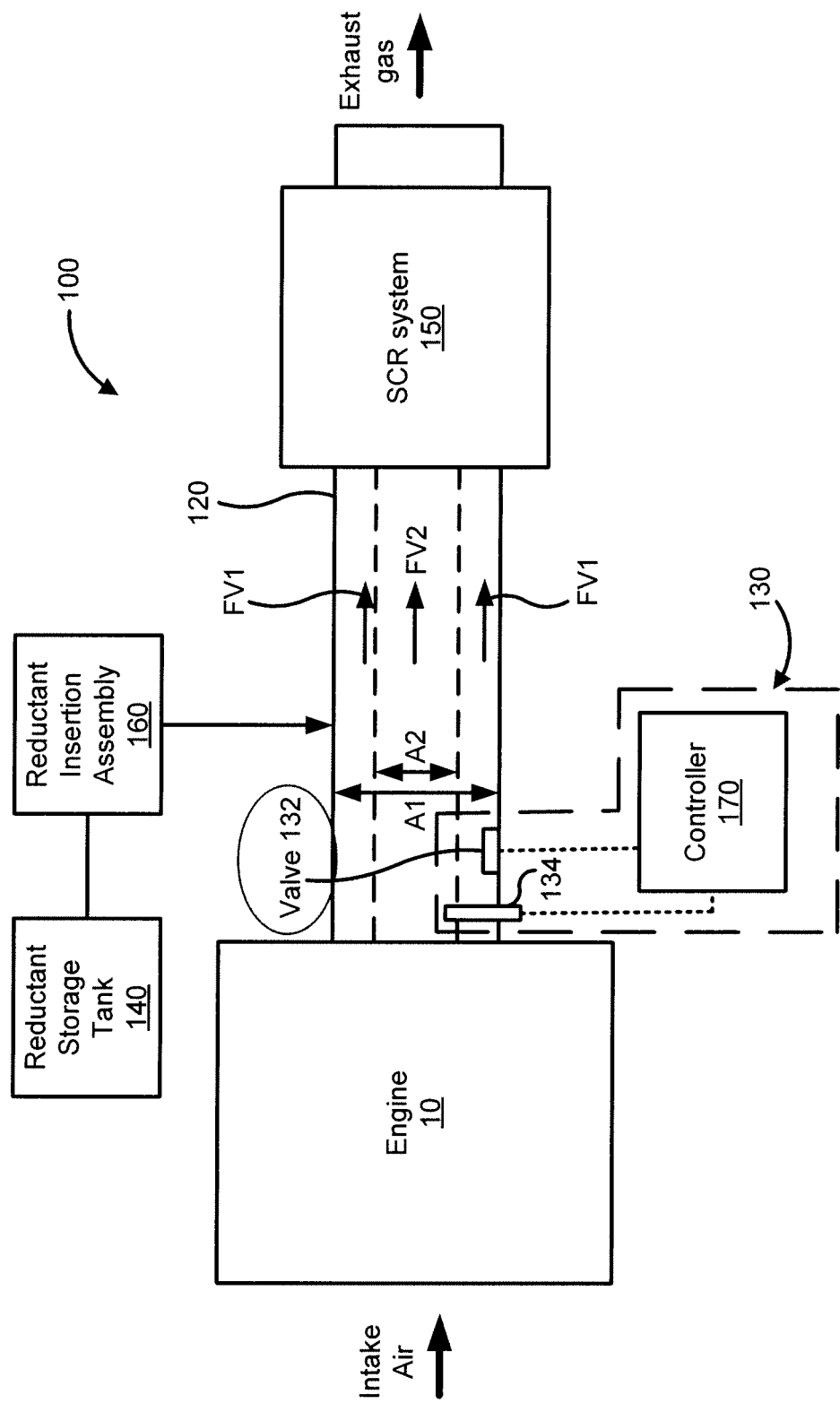
FIG. 1 is a schematic block diagram of an aftertreatment system including an exhaust conduit structured to adjust a flow velocity of an exhaust gas flowing through the exhaust conduit, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of controlling flow velocity of an exhaust gas through an exhaust conduit of an aftertreatment system, and in particular to systems and methods for adjusting a cross-sectional area of an exhaust conduit of an aftertreatment system to adjust the flow velocity of the exhaust gas flowing through the exhaust conduit.

The exhaust gas flowing through an exhaust conduit of an aftertreatment system exerts a shear stress on the exhaust conduit and various components of the aftertreatment system. This shear stress aids in removing liquid reductant film and solidified reductant deposits from sidewalls of the exhaust conduit, portion of the exhaust conduit or components of the aftertreatment system (e.g., mixers, blades, fins, splash plates, partition walls or any other components that can be included in the aftertreatment system 100) where the reductant might have accumulated. Shear stress is a direct function of flow velocity, by fluid dynamic scientific standards. A higher velocity of the exhaust gas exerts a higher shear stress on the aftertreatment component leading to greater reduction in reductant deposits. As the engine operation point changes, air flow (e.g., mass based: lb/min, kg/min, kg/sec, etc.) through the engine changes which is directly correlated to the generation and flow rate of the exhaust gas. The flow rate corresponds to the flow velocity of the exhaust gas entering the exhaust conduit. Due to conservation of mass principle, as mass flow rate increases or decreases, flow velocity increases and decreases, respectively. As flow velocity increases, shear stress inside the exhaust pipe increases. This increase in shear stress generates higher drag on reductant pools and wall film, with the potential to 'tear' the reductant film from the internal structure of the exhaust pipe, for example sidewalls or corners of aftertreatment components positioned within the exhaust conduit.

At high exhaust flow rates, this shear stress is often sufficient to keep the internal geometry clean. However, at low exhaust flow rates, the exhaust gas flow velocity, and thereby the shear stress, may be too small to shear the reductant film/deposits. Smaller displacement engines often use smaller diameter exhaust pipes or conduits due to cost savings associated with less material in the exhaust. Using a smaller diameter exhaust pipe on a larger engine, however, creates a very high pressure drop scenario, generated by the high flow through a pipe that is too small for the engine flow rates. Therefore, larger displacement engines typically use larger diameter exhaust pipes. With the larger diameter exhaust pipe, the large displacement engine achieves very low flow velocity at low engine flow rates. At such flow rates, the exhaust gas flow velocity—and thereby the shear force in the exhaust pipe—is too low. This reduction in shear force creates an environment for reductant spray impingement and reductant deposit generation. Thus, the aftertreatment systems of large engines often experience increased reductant deposits and higher maintenance costs.

Various embodiments of the systems and methods of reducing reductant deposit by adjusting a flow velocity of the exhaust gas via adjusting a cross-sectional area of an exhaust conduit described herein may provide benefits. These benefits include, for example (1) real time adjusting of flow velocity of the exhaust gas based on an initial flow rate of the exhaust gas produced by the engine; (2) maintaining the flow velocity of the exhaust gas within a predetermined range even when initial flow rate, and thereby initial flow velocity of the exhaust gas is very low, thereby exerting sufficient shear stress on sidewalls of the exhaust conduit to reduce reductant deposits; (3) providing exhaust conduits that include a plurality of channels that can be selectively closed to adjust the cross-sectional area of the exhaust conduit and thereby adjust a flow velocity of the exhaust gas; and (4) achieving an order of magnitude increase in shear stress exerted by the exhaust gas on the internal components of the exhaust conduit and the aftertreatment system to reduce reductant deposits.

FIG. 1 is a schematic illustration of an aftertreatment system 100, according to an embodiment. The aftertreatment system 100 is fluidly coupled to an engine 10 and configured to decompose constituents of the exhaust gas (e.g., NOx gases) produced by the engine 10. The engine 10 can include an IC engine operable on diesel, gasoline, natural gas, biodiesel, ethanol, liquefied petroleum gas (LPG) or any other fuel source. In various embodiments, the engine can include a large capacity engine, for example having a 12 liter or 15 liter capacity engine. The aftertreatment system 100 includes an exhaust conduit 120, a cross-section adjusting mechanism 130, a reductant storage tank 140, a reductant insertion assembly 160, a controller 170, a flow rate sensor 134 and a SCR system 150.

The SCR system 150 includes one or more catalysts formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any NOx gases included in the exhaust gas are further reduced to yield an exhaust gas which is substantially free of carbon monoxide, and NOx gases.

A reductant insertion assembly 160 is fluidly coupled to the exhaust conduit 120 and a reductant storage tank 140. The reductant insertion assembly 160 is configured to selectively insert a reductant into the exhaust conduit 120, and can include, for example pumps, valves, conduits, etc. configured to deliver the reductant from the reductant storage tank 140 to the exhaust conduit 120. In various embodiments, the reductant insertion assembly can include an insertion unit (not shown), for example an injector positioned on the exhaust conduit. The insertion unit can be configured to insert the reductant received from the reductant insertion assembly 160 into the exhaust conduit 120.

Any suitable reductant can be used. In some embodiments, the exhaust gas can include a diesel exhaust gas and the reductant can include a diesel exhaust fluid. The diesel exhaust fluid can include urea, an aqueous solution of urea, or any other fluid that includes ammonia, by products, or any other diesel exhaust fluid as is known in the arts (e.g., the diesel exhaust fluid marketed under the name)ADBLUE®.

While shown as including the SCR system 150, the aftertreatment system 100 can also include other components, for example one or more flow mixers, particulate filters, oxidation catalysts (e.g., a diesel oxidation catalyst or an ammonia oxidation catalyst), temperature sensors, oxygen sensors, NOx sensors, ammonia sensors, and/or any other components. In some embodiments, a mixer (not shown) is positioned downstream of the exhaust conduit 120 and upstream of the SCR system 150. The mixer is configured to facilitate mixing of the exhaust gas with the reductant by increasing residence time of the exhaust gas in the mixer and/or increasing turbulence to promote mixing. The mixer can include blades, vanes, passages or any suitable structures to facilitate mixing of the exhaust gas with the reductant. Suitable mixers include without limitation, baffle mixers, swirl mixers, tab mixers, etc.

The exhaust conduit 120 is fluidly coupled to the engine 10 and the SCR system, the exhaust conduit 120 has an initial cross-section and defines an initial cross-sectional area A1. The exhaust conduit 120 is structured to receive the exhaust gas from the engine 120 at an initial flow rate corresponding to an initial flow velocity FV1 which increase or decreases based on an operating condition of the engine 10. For example, at low engine speeds or loads, for example during an engine startup, the speed and volume of the exhaust gas produced by the engine 10 can be relatively low. In contrast, at high load conditions, the air intake into the engine 10 and therefore, the initial flow rate corresponding to the initial flow velocity of the exhaust gas produced by the engine 10 can be substantially higher than the initial flow rate and, thereby initial flow velocity FV1 of the exhaust gas at low loads.

While the initial flow velocity FV1 of the exhaust gas at high loads may be sufficient to apply sufficient shear stress for removing and/or preventing reductant deposits from accumulating on the sidewalls of the exhaust conduit 120, interval walls of one or components of the aftertreatment system as described herein, the initial flow velocity FV1 at low loads may not provide sufficient shear stress to remove reductant deposits. A cross-sectional area of the exhaust conduit 120 is adjustable between the initial cross-sectional area A1 to an adjusted cross-sectional area A2 to adjust the flow velocity of the exhaust gas through the exhaust conduit 120, as described herein.

A cross-section adjusting mechanism 130 is operatively coupled to the exhaust conduit 120. The cross-section adjusting mechanism 130 can include a cross-section adjust mechanism, for example a valve 132 (as described in detail below) configured to increase or decrease the cross-sectional area A1 of the exhaust conduit 120 in response to the initial flow rate of the exhaust conduit 120. The increase or decrease of the cross-sectional area changes the initial flow velocity FV1 of the exhaust gas to an adjusted flow velocity FV2 which is different from the initial flow velocity FV1, i.e., lower or higher, respectively.

For example, the cross-section adjusting mechanism 130 can be configured to reduce the initial cross-sectional area A1 of the exhaust conduit 120 to the adjusted cross-sectional area A2, which is smaller than the initial cross-sectional area A1. The reduction to the adjusted cross-sectional area A2 causes the initial flow velocity FV1 to increase to the adjusted flow velocity FV2 greater than the initial flow velocity FV1. The higher adjusted flow velocity FV2 can exert a greater shear stress on reductant pools and deposits accumulated on sidewalls of the exhaust conduit 120 or components of the aftertreatment system 100 as described herein, thereby preventing excessive increases in backpressure, maintain catalytic efficiency of the catalyst included in the SCR system 150 and reducing maintenance costs.

For example, the exhaust gas at the adjusted flow velocity FV2 exerts a shear stress on inner surfaces of the exhaust conduit 120 which is sufficient to shear off any reductant pools or reductant deposits from inner surfaces of the exhaust conduit 120 or any other component included in the aftertreatment system 100. The reducing the initial cross-sectional area A1 of the exhaust conduit 120 to the adjusted cross-sectional area A2 causes the shear stress to be maintained within a predetermined range irrespective of the initial flow velocity FV1 of the exhaust gas. In other words, the cross-section adjusting mechanism 130 is configured to dynamically adjust the initial cross-sectional area A1 of the exhaust conduit 120 so that the initial flow velocity FV1 is maintained within a predetermined range. The predetermined range is sufficient to shear off any reductant pools or reductant deposits from inner surfaces of the exhaust conduit 120 without having any significant impact on a catalytic conversion efficiency of the SCR system 150 or any other aftertreatment components that can be included in the aftertreatment system 100. A quantity of the reductant inserted into the exhaust conduit 120 can also be adjusted based on the adjusted flow velocity FV2 of the exhaust gas.

In various embodiments, the increasing the initial flow velocity FV1 to the adjusted flow velocity FV2 can also increase convective heat transfer to the sidewalls of the exhaust conduit 120, of walls/and or sidewalls or surfaces of one or more components of the aftertreatment system 100. Increased convective heat transfer can increase the temperature of the sidewalls of the of the exhaust conduit 120 or components of the aftertreatment system 100 which can further aid in preventing and reducing reductant deposition on such surfaces.

In various embodiments, the cross-section adjusting mechanism 130 reduces the initial cross-sectional area A1 to the adjusted cross-sectional area A2 when the initial flow rate (which corresponds to the initial flow velocity FV1) of the of the exhaust gas is lower than a predetermined threshold (e.g., a threshold flow rate, a threshold operational parameters of the engine 10, a threshold temperature of the exhaust gas or any other suitable threshold). Once the initial flow rate of the exhaust gas becomes equal to or exceeds the predetermined threshold, the cross-section adjusting mechanism 130 can increase the cross-sectional area of the exhaust conduit 120 to the initial cross-sectional area A1 so that the adjusted flow velocity FV2 is equal to or different than the initial flow velocity FV1.

The exhaust conduit 120 can define any suitable cross-sectional shape or size. For example, the exhaust conduit 120 can have a circular, square, rectangular, oval, elliptical, polygonal contoured or any other suitable cross-sectional shape. In some embodiments, the exhaust conduit 120 can be expandable or contractible, for example formed from a flexible material (e.g., mesh wire) to allow adjustment of the cross-sectional area thereof.

In various embodiments, adjustment of the cross-sectional area of the exhaust conduit 120 is accomplished via adjusting in an internal flow area of the exhaust conduit 120 without changing an external cross-section (e.g., diameter, width, etc.) of the exhaust conduit 120. For example, the exhaust conduit 120 can include plurality of channels (e.g., as shown with respect to FIGS. 3-7) defined within the exhaust conduit 120. The plurality of channels are structured to allow at least a portion of the exhaust gas to pass therethrough. The initial cross-sectional area A1 of each of the plurality of channels corresponds to a sum of the cross-sectional area of each of the plurality of channels.

The exhaust gas entering the exhaust conduit 120 at the initial flow velocity FV1 divides into a plurality of portions proximal to an inlet of the exhaust conduit 120 with each portion of the exhaust gas communicated through a corresponding channel of the plurality of channels. Each portion of the exhaust gas flows at the initial flow velocity FV1. In such embodiments, the cross-section adjusting mechanism 130 is configured to selectively block exhaust gas flow through at least one of the plurality of channels. This forces the exhaust gas to only flow through the remaining open channels. Since the sum of the cross-sectional area of the open channels is less than the sum of the cross-sectional area of the all the channels, the initial flow velocity FV1 of the portions of the exhaust gas flowing through the open channels increases to the adjusted flow velocity FV2.

In various embodiments, only a portion of the plurality of channels are open at the initial flow rate and are shaped and sized so that the initial flow velocity FV1 of the exhaust gas is maintained while flowing through the portion of the plurality of channels. In such embodiments, the initial flow velocity FV1 of the exhaust gas can be selectively increased by closing more additional channels, or decreased by opening at least one of the portion of the plurality of channels which are initially closed.

In various embodiments in which the exhaust conduit includes a plurality of channels, the cross-section adjusting mechanism 130 includes a flow rate sensor 134, at least one valve 132 and a controller 170. The flow rate sensor 134 is positioned proximate to the inlet of the exhaust conduit 120 and configured to measure the initial flow rate corresponding to the initial velocity FV1 of the exhaust gas entering the exhaust conduit 120. Any suitable flow rate sensor 134 can be used such as a rotary potentiometer flow sensor, a thermal mass flow meter, Doppler flow sensor, a hall effect flow sensor or any other suitable flow velocity sensor. In some embodiments, the controller 170 can be configured to use information or data from the flow rate sensor 134 to determine the initial flow velocity FV1 of the exhaust gas entering the exhaust conduit 120, for example using the initial cross-sectional area of the exhaust conduit 120.

In various embodiments, the flow rate sensor 134 can include a virtual sensor. For example, the controller 170 can include look up tables, algorithms, equations or otherwise (e.g., stored on a memory of the controller 170) configured to determine the initial flow rate of the exhaust gas based on one or more operational parameters of the engine 10 or the exhaust gas so that a physical flow rate sensor is not positioned in the exhaust conduit. For example, the controller 170 can determine the initial flow rate of the exhaust gas based on an intake air pressure (e.g., measured by an intake air pressure sensor) of the air entering the engine 10, an exhaust pressure of the exhaust gas expelled from the engine 10 (e.g., measured by an exhaust gas pressure sensor), a fueling rate, an rpm (revolutions per minute) or torque of the engine, a temperature of the exhaust gas expelled from the engine 10, or any combination thereof.

In still other embodiments, the aftertreatment system 100 can include a gas flow velocity sensor in addition to or in place of the flow rate sensor 134 to determine the initial flow velocity FV1 of the exhaust gas. For example, a flow velocity sensor such as a hot wire anemometer can be positioned at an exhaust gas outlet of the engine 10. The flow velocity sensor can generate electrical signals corresponding to the initial flow velocity FV1 of the exhaust gas. These signals can be interpreted by controller 170 to determine the initial flow velocity FV1 of the exhaust gas.

The at least one valve 132 is positioned at an inlet of at least one of the plurality of channels and structured to be selective closed to prevent a portion of the exhaust gas from entering the corresponding channel of the plurality of channels. For example, the at least one valve 132 can initially be in an open configuration and configured to be closed based on the initial flow rate of the exhaust gas to prevent at least a portion of the exhaust gas from entering the corresponding channel. The exhaust gas is therefore forced to flow through only the remaining open channels defining the adjusted cross-sectional area A2 less than the initial cross-sectional area A1, so that the initial flow velocity FV1 of the exhaust gas increases to the adjusted flow velocity FV2. The valve 132 can include any suitable valve, for example a butterfly valve, a gate valve, a check valve (e.g., a tilting disc check valve, a swing check valve, an axial check valve, etc.), a ball valve, a spring loaded valve, waste gate valve or any other valve.

The controller 170 is communicatively coupled to the flow rate sensor 134 (e.g., a physical flow rate sensor or a virtual flow rate sensor) and the valve 132. The controller 170 can include any suitable controller, for example the computer device 830 as described in detail herein. The controller 170 is configured to interpret an output signal from the flow rate sensor 134, for example a current or a voltage, which is indicative to the initial flow velocity FV1 of the exhaust gas. The controller 170 compares the initial flow rate of the exhaust gas with a predetermined threshold. For example, the predetermined threshold can correspond to a threshold flow rate, threshold operational parameters of the engine 10, a threshold temperature of the exhaust gas or any other threshold. If the initial flow rate of the exhaust gas is lower than the predetermined threshold, the controller 170 instructs the at least one valve 132 to move into a closed position to close an inlet of at least one of the plurality of channel of the exhaust conduit 120. As described before, the closing of the at least one valve 132 causes the exhaust gas to flow through only a portion of the plurality of channels so that the exhaust conduit 120 has the adjusted cross-sectional area A2 which corresponds to the sum of the cross-sectional area of the portion of the plurality of channels.

Figure 2:
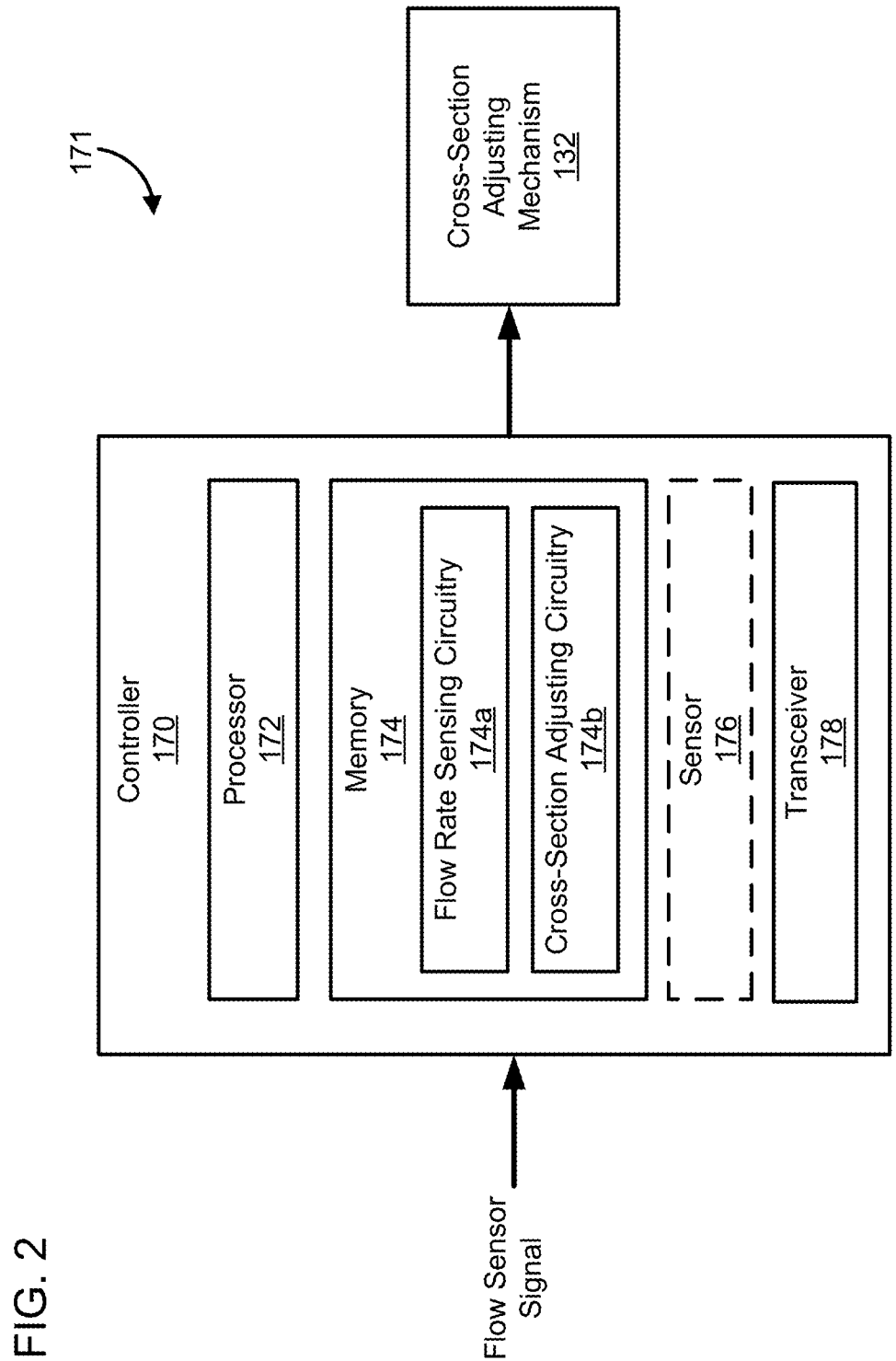
FIG. 2 is a schematic block diagram of a particular embodiment of a control circuitry that can be included in the aftertreatment system of FIG. 1.

In particular embodiments, the controller 170 can be included in a control circuitry. For example, FIG. 2 is a schematic block diagram of a control circuitry 171 that includes the controller 170 according to an embodiment. The controller 170 includes a processor 172, a memory 174 or other computer readable medium, a transceiver 178 and optionally, a sensor 176. It should be understood that the controller 170 shows only one embodiment of the controller 170 and any other controller capable of performing the operations described herein can be used.

The processor 172 can include a microprocessor, programmable logic controller (PLC) chip, an ASIC chip, or any other suitable processor. The processor 172 is in communication with the memory 174 and configured to execute instructions, algorithms, commands or otherwise programs stored in the memory 174.

The memory 174 includes any of the memory and/or storage components discussed herein. For example, memory 174 may include RAM and/or cache of processor 172. The memory 174 may also include one or more storage devices (e.g., hard drives, flash drives, computer readable media, etc.) either local or remote to device controller 170. The memory 174 is configured to store look up tables, algorithms or instructions.

The memory 174 includes a flow rate sensing circuitry 174a configured to interpret the output signal from the flow rate sensor 134, for example a current or a voltage. The output signal is indicative of the initial flow rate of the exhaust gas. In various embodiments, flow rate sensing circuitry 174a is also configured to determine the initial flow rate of the exhaust gas from the output signal.

The memory 174 also includes a cross-section adjusting circuitry 174b configured to instruct the cross-section adjusting mechanism 132 (e.g., a valve) to increase or decrease the initial cross-sectional area A1 of the exhaust conduit 120 based on the initial flow rate of the exhaust gas. The increase or decrease of the initial cross-sectional area A1 changes the initial flow velocity FV1 to the adjusted flow velocity FV2 different from the initial flow velocity FV1.

The exhaust conduit 120 can include a plurality of channels, and the cross-section adjusting mechanism 130 includes at least one valve 132 positioned at an inlet of at least one of the plurality of channels, as described herein. In such embodiments, the cross-section adjusting circuitry 174b is also configured to compare the initial flow rate of the exhaust gas with the predetermined threshold (e.g., an exhaust gas flow velocity threshold or any other threshold described herein). If the initial flow rate is lower than the predetermined threshold, the cross-section adjusting circuitry 174b instructs the at least one valve to move into a closed position to close the inlet of the corresponding channel of the plurality of channels.

For example, the at least one valve 132 can include an actuator (e.g., a hydraulic actuator, a lead screw, a positon, a spring, a gear, a lever or any other suitable actuator) operatively coupled thereto. The cross-section adjusting circuitry 174b can instruct the actuator to selectively move the valve 132 between the open and the closed positions. The moving of the at least one valve 132 into the closed position causes the exhaust gas to flow through only a portion of the plurality of channels so that the exhaust conduit 120 has a reduced cross-sectional area corresponding to a sum of the cross-sectional areas of the portion of the plurality of channels.

The controller 170 also includes a transceiver 178 configured to generate an activating signal (e.g., a current or a voltage) to activate the actuator for selectively moving the at least one valve 132 between the open position and the closed position. The activating signal can include a voltage, a current or any other electrical signal communicated to actuator or otherwise the valve to open or close the valve. In various embodiment, the controller 170 can also include a sensor 176 configured to sense the initial flow rate from the flow rate sensor 134.

Although not shown in FIG. 1, the aftertreatment system 100 can include sensors such as, for example, temperature sensors, pressure sensors, NOx sensors, oxygen sensors, ammonia sensors and/or any other sensors. The controller 170 may be communicatively coupled to one or more such sensors to receive and interpret signals from one or more of these sensors, for example to determine the initial flow rate and/or flow velocity FV1.

Figure 3A:
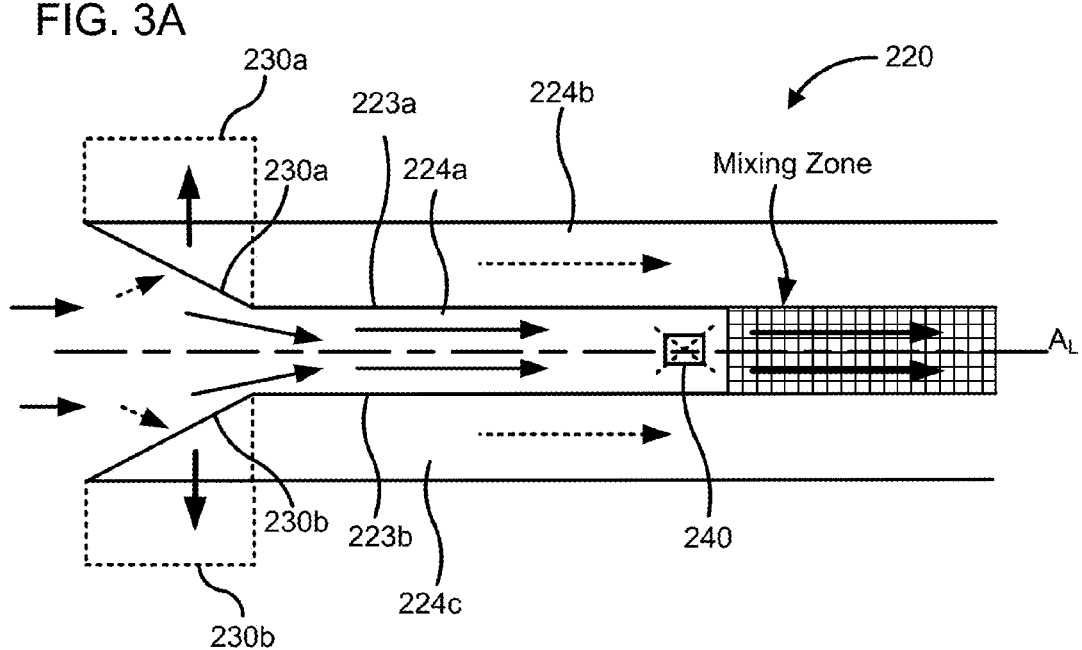
FIG. 3A is a top cross-section view of another embodiment of an exhaust conduit that includes a plurality of valves positioned at an inlet of a portion of a plurality of channels of the exhaust conduit.
Figure 3B:
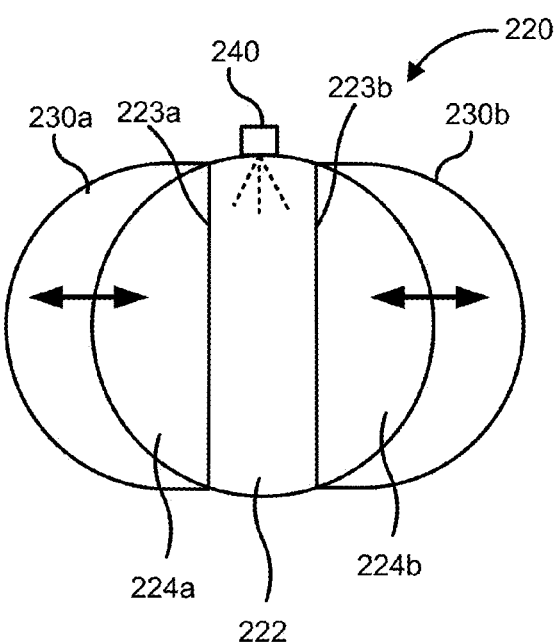
FIG. 3B is a front view of the exhaust conduit of FIG. 3A.

FIG. 3A is a top cross-section view and a FIG. 3B is a front view of an embodiment of an exhaust conduit 220 according to another embodiment. The exhaust conduit 220 can be used in any aftertreatment system, for example the aftertreatment system 100 and is structured to allow adjustment of a flow velocity of an exhaust gas flowing therethrough.

The exhaust conduit 220 includes a first sidewall 223a positioned within an inner volume defined by the exhaust conduit 220. The first sidewall 223a is positioned parallel to a longitudinal axis $A_L$ of the exhaust conduit 220. A second sidewall 223b is also positioned within the internal volume defined by the exhaust conduit 220. The second sidewall 223b positioned parallel to the longitudinal axis $A_L$ of the exhaust conduit 220 opposite the first sidewall 223a. The first sidewall 223a and the second sidewall 223b divide the exhaust conduit 220 into a first channel 224a positioned at the center of the exhaust conduit 220, a second channel 224b positioned parallel to the first channel 224a, and a third channel 224c also positioned parallel to the first channel 224a at an opposite side of the exhaust conduit 220 relative to the second channel 224b. That is the first sidewall 223a and the second sidewall 223b divide the exhaust conduit 220 into three parallel channels. The first channel 224a defines a first cross-sectional area and the second channel 224b defines a second cross-sectional area which can be the same or different than the first cross-sectional area. Furthermore, the third channel 224c defines a third cross-sectional area which can be equal to or different than the first cross-sectional area and the second cross-sectional area.

A first valve 230a is positioned at a second channel inlet of the second channel 224b and a second valve 230b is positioned at a third channel inlet of the third channel 224c. The first valve 230a and the second valve 230b can include a sliding valve, a check valve, a butterfly valve or any other valve described herein. A reductant insertion unit 240 (e.g., an injector) is positioned downstream of the first valve 230a and the second valve 230b and configured to insert a reductant (e.g., an aqueous urea solution) into the exhaust gas flow.

An initial cross-sectional area of the exhaust conduit 220 includes a sum of the first cross-sectional area of the first channel 224a, the second cross-sectional area of the second channel 224b and the third cross-sectional area of the third channel 224c. The exhaust gas enters the exhaust conduit 220 at an initial flow velocity which depends on the engine operational parameters, as described herein. In a first configuration, the first valve 230a and the second valve 230b can be open so that a portion the exhaust gas flows through each of the first channel 224a, the second channel 224b and the third channel 224c at the initial flow velocity.

The first valve 230a and the second valve 230b can be selectively closed to close the second channel 224b and the third channel 224c (e.g., via a controllers such as the controller 170 communicatively coupled to the first valve 230a or the second valve 230b). In this manner, the exhaust gas can be forced to flow through only the first channel 224a, the first channel 224a and the second channel 224b, or the first channel 224a and the third channel 224c having a smaller cross-sectional area less than the initial cross-sectional area of the exhaust conduit 220. The flow velocity of the exhaust gas is thereby adjusted, as described herein.

For example, if the initial flow velocity or an initial flow rate of the exhaust gas (e.g., measured by a flow rate sensor such as the flow rate sensor 134 positioned in the exhaust conduit 220) is less than a predetermined threshold (e.g., a threshold flow rate, threshold flow velocity, a threshold operational parameters of the engine, a threshold temperature of the exhaust gas or any other suitable threshold), the first valve 230a is closed so that the exhaust gas can flow through only the first channel 224a and the third channel 224c. The exhaust conduit 220, thereby has an adjusted cross-sectional area equal to the sum of the first cross-sectional areas of the first channel 224a and the third cross-sectional areas of the third channel 224c which results in a corresponding increase in the initial flow velocity of the exhaust conduit to a first adjusted flow velocity.

If the initial flow rate or adjusted flow velocity is still less than the predetermined threshold after closing the first valve 230a, the second valve 230b can also be closed to prevent the flow of the exhaust gas into the third channel 224c, as shown in FIG. 3A. The exhaust gas can only flow through the first channel 224a so that the exhaust conduit has an adjusted cross-sectional area equal to only the first cross-sectional area of the first channel 224a. The flow velocity of the exhaust gas correspondingly increases to a second adjusted flow velocity greater than the initial flow velocity and the first adjusted flow velocity. In this manner, the closing and opening of the first valve 230a and the second valve 230b, and thereby the second channel 224b and the third channel 224c is used to selectively adjust the cross-sectional area of the exhaust conduit 220 to adjust or otherwise control the flow velocity of the exhaust gas, for example to maintain the exhaust gas flow velocity within a predetermined range.

In some embodiments, each of the first valve 230a and the second valve 230b are positioned orthogonal to the longitudinal axis $A_L$ of the exhaust conduit 220, respectively (e.g., at an angle 80, 85, 90, 95, 100 or 105 degrees inclusive of all ranges and values therebetween). In various embodiments, the first valve 230a and/or the second valve 230b can be inclined at an angle with respect to the first channel inlet (e.g., at an angle of about 25, 30, 35, 40, 45, 50, 55, 60, 65, 70 or 75 degrees). The angled first valve 230a and/or second valve 230b can direct the flow of the exhaust gas towards the first channel 224a in their closed positions, thereby allowing smooth transition of the exhaust gas from the initial cross-sectional area of the exhaust conduit 220 at an inlet of the exhaust conduit 220, to the first cross-sectional area of the first channel 224a.

In some embodiments, each of the first valve 230a and the second valve 230b can include spring loaded valves. The springs or any other biasing member can be structured to allow the first valve 230a and the second valve 230b to progressively open corresponding to an increase in the initial flow velocity of the exhaust gas or pressure exerted on the first valve 230a and/or the second valve 230b. In various embodiments, the spring or any other biasing member is calibrated to open based on an exhaust gas backpressure, for example determined via back pressure gauge positioned within the exhaust gas flow path.

Figure 4A:
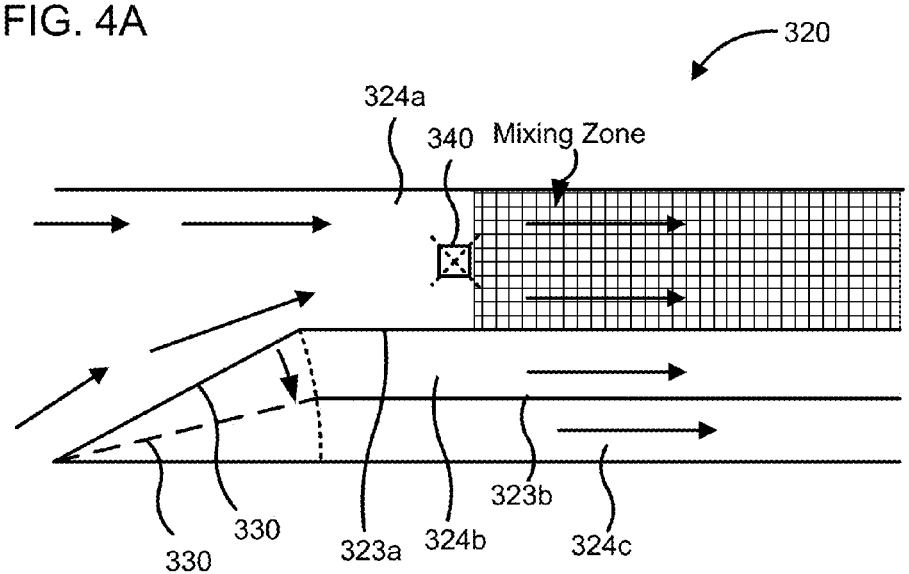
FIG. 4A is a top cross-section view of yet another embodiment of an exhaust conduit that includes a valve positioned at in inlet of a channel of an exhaust conduit that includes a three channels.
Figure 4B:
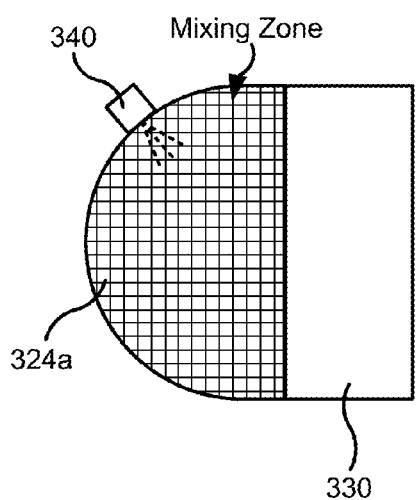
FIG. 4B is front view of the exhaust conduit of FIG. 4A with the valve open.

FIG. 4A is a top cross-section of another embodiment of an exhaust conduit 320. The exhaust conduit 320 can be used in any aftertreatment system, for example the aftertreatment system 100 and is structured to allow adjustment of a flow velocity of an exhaust gas flowing therethrough.

The exhaust conduit 320 includes a first sidewall 323a positioned within an inner volume defined by the exhaust conduit 320. The first sidewall 323a is positioned parallel to a longitudinal axis $A_L$ of the exhaust conduit 320. A second sidewall 323b is also positioned within the internal volume defined by the exhaust conduit 320. The second sidewall 323b is positioned parallel to the longitudinal axis $A_L$ of the exhaust conduit 320 opposite the first sidewall 323a. The first sidewall 323a and the second sidewall 323b divide the exhaust conduit 320 into a first channel 324a positioned at the center of the exhaust conduit 320, a second channel 324b positioned parallel to the first channel 324a, and a third channel 324c also positioned parallel to the second channel 324b. That is, the first sidewall 323a and the second sidewall 323b divide the exhaust conduit 320 into three parallel channels. The first channel 324a defines a first cross-sectional area, and the second channel 324b defines a second cross-sectional area which can be the same or different than the first cross-sectional area. Furthermore, the third channel 324c defines a third cross-sectional area which can be equal to or different than the first cross-sectional area and the second cross-sectional area.

A valve 330 is positioned at an inlet of the second channel 324b and the third channel. The valve 330 can include a sliding valve or check valve. A reductant insertion unit 340 (e.g., an injector) is positioned downstream of the valve 330 and configured to insert a reductant (e.g., an aqueous urea solution) into the exhaust gas flow. As shown in FIG. 4A the valve 330 is inclined at an angle with respect to a first channel inlet of the first channel 324a and the second channel (e.g., at an angle of about 25, 30, 35, 40, 45, 50, 55, 60, 65, 70 or 75 degrees). The angled valve 330 is structured to direct the flow of the exhaust gas towards the first channel 324a and/or the second channel 324b as described herein, thereby allowing smooth transition of the exhaust gas from the initial cross-sectional area of the exhaust conduit 320 at an inlet of the exhaust conduit 320, to the first cross-sectional area of the first channel 324a and/or the second cross-sectional area of the second channel 324b, as described herein.

For example, the valve 330 can include a spring loaded valve which can be hinged proximate to an inlet of the exhaust conduit 320. The spring(s) (or another form of biasing member) can be structured to allow the first valve 330 to progressively open by pivoting about a hinge so that the inclination angle of the valve 330 is reduced, corresponding to an increase in the initial flow velocity of the exhaust gas. In various embodiments, the spring or other biasing member is calibrated based on an exhaust gas backpressure, for example determined via back pressure gauge positioned within the exhaust gas flow path.

In various embodiments, the valve 330 is closed in an initial configuration, for example in scenarios where the exhaust gas flow velocity is smaller than a predetermined threshold (e.g., at low engine loads, engine idling or engine startup). The valve 330 is closed in the initial configuration, for example because of a biasing force exerted by a biasing member or spring operatively coupled to the valve. The force exerted by the exhaust gas flowing over the valve is a function of: 1) horizontal momentum of the flowing exhaust gas impacting the surface of the valve 330; and 2) a pressure differential between the upstream side of the valve 330 and the downstream side thereof because of compression of the exhaust gas flow from a larger cross-section flow area at the inlet of the exhaust conduit to the smaller first cross-sectional area of the first channel 324a.

In the initial configuration, the force corresponding to the exhaust gas momentum and pressure differential as described herein, is insufficient to displace the biasing member (e.g., compress or expand the biasing member) so that the valve 330 remains closed and the exhaust gas flows only through the first channel 324a. The exhaust gas experiences a corresponding increase in flow velocity from an initial flow velocity to first adjusted flow velocity.

As the first adjusted flow velocity increases and exceeds the predetermined threshold, the force (corresponding to the exhaust gas momentum and pressure differential as described herein) exerted by the exhaust gas flow on the valve 330 causes the valve 330 to pivot and an edge of the valve 330 proximate to a first channel inlet of the first channel 324a to move away therefrom distal from the first sidewall 323a. This opens the second channel 324b so that at least a portion of the exhaust gas can also flow through the second channel 324b. The cross-sectional area of the exhaust conduit 320 now includes the sum of the first channel 324a and the second channel 324b. The increase in the cross-sectional area adjusts the initial flow velocity of the exhaust gas to a second adjusted flow velocity greater than the initial flow velocity but less than the first initial flow velocity.

Figure 4C:
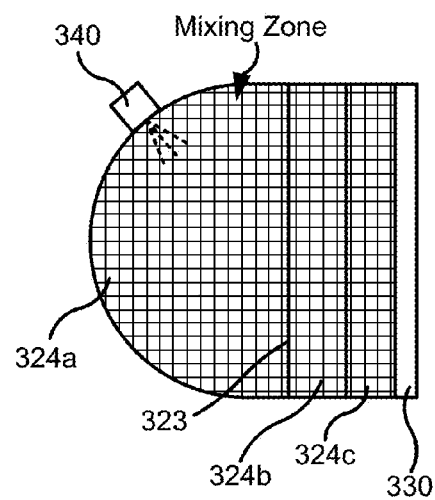
FIG. 4C is also a front view of the exhaust conduit of FIG. 4A with the valve closed.

Further increase in the initial flow velocity of the exhaust gas correspondingly increases the force on the valve 330 until at a certain flow velocity (e.g., if the second adjusted flow velocity also exceeds the predetermined threshold), the force is sufficient for the valve 330 to rotate past the second sidewall 323b. This opens the third channel 324c, as shown in FIG. 4C thereby allowing the exhaust gas to now flow through each of the first channel 324a, the second channel 324b and the third channel 324c. The cross-sectional area of the exhaust conduit 320 now includes the sum of the first cross-sectional area of the first channel 324a, the second cross-sectional area of the second channel 324b and the third cross-sectional area of the third channel 324c. Furthermore, the exhaust gas has a third adjusted flow velocity which is equal to or greater than the initial flow velocity of the exhaust gas.

Figure 4E:
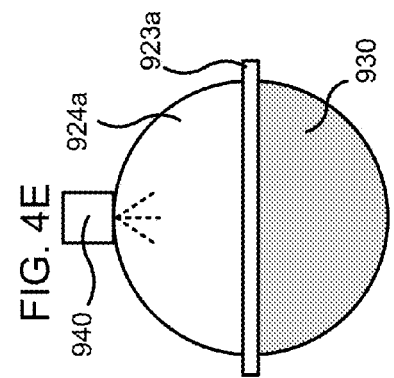
FIGS. 4D and 4E are side cross-section views of another embodiment of an exhaust conduit with a valve positioned at an inlet of the exhaust conduit in an open position.
Figure 4G:
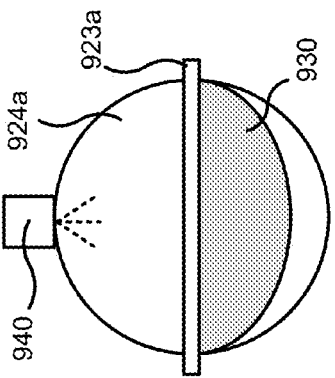
FIGS. 4F and 4G are side cross-section views of the exhaust conduit of FIGS. 4D and 4E with the valve in an open position.
Figure 4D:
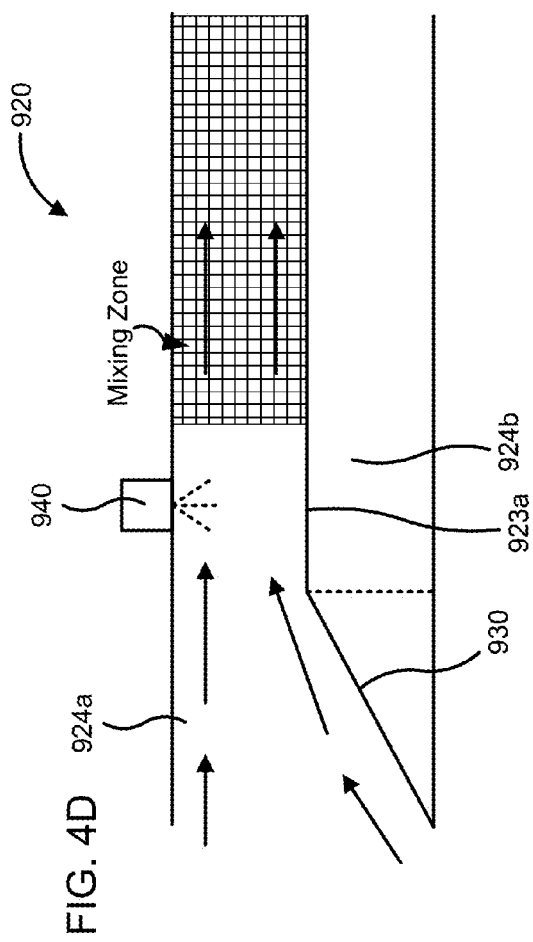

FIG. 4D is a side cross-section of another embodiment of an exhaust conduit 920 in a closed positioned and FIG. 4E is a front view thereof. The exhaust conduit 920 can be used in any aftertreatment system, for example the aftertreatment system 100 and is structured to allow adjustment of a flow velocity of an exhaust gas flowing therethrough.

The exhaust conduit 920 includes a sidewall 923a positioned within an inner volume defined by the exhaust conduit 920. The sidewall 923a is positioned parallel to a longitudinal axis $A_L$ of the exhaust conduit 920. The sidewall 923a divides the exhaust conduit 920 into a first channel 924a and a second channel 924b positioned parallel to each other. The first channel 924a defines a first cross-sectional area and the second channel 924b defines a second cross-sectional area which can be the same or different than the first cross-sectional area.

A valve 930 is positioned at an inlet of the channel 924b. The valve 330 can include a pneumatic valve, a hydraulic valve, a spring activated valve or any other suitable valve. A reductant insertion unit 940 (e.g., an injector) is positioned downstream of the valve 930 and configured to insert a reductant (e.g., an aqueous urea solution) into the exhaust gas flow. The valve 330 is hingedly coupled to an end of the sidewall 923a proximate to the inlet of the exhaust conduit. FIGS. 4D and 4E show the valve 930 in a closed configuration.

In the closed configuration, the valve 930 is inclined at an angle with respect to a first channel inlet of the first channel 924a so that a proximate valve end of the valve 930 distal from the sidewall 923a is contact with a sidewall of the exhaust conduit 920, thereby closing the second channel 924b. The angled valve 930 is structured to direct the flow of the exhaust gas towards the first channel 924a in the first configuration as described herein, thereby allowing smooth transition of the exhaust gas from the initial cross-sectional area of the exhaust conduit 920 at an inlet of the exhaust conduit 920, to the first cross-sectional area of the first channel 924a.

Figure 4F:
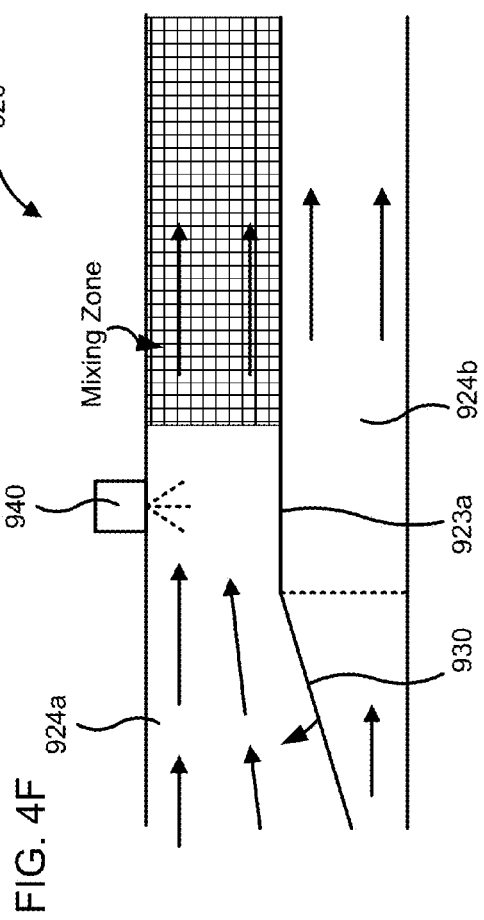

FIG. 4F is a side cross-section and FIG. 4G is a front view of the exhaust conduit 920 showing the valve 930 in an open configuration. For example, the in the first configuration, the initial flow rate of the exhaust gas can be below a predetermined threshold, as described herein. Once the initial flow rate of the exhaust gas or otherwise an initial flow velocity of the exhaust gas exceeds the predetermined threshold, the valve opens to allow the exhaust gas to flow through each of the first channel 924a and the second channel 924b. To open the valve 930, the valve is hingedly moved about the end of the sidewall 923a by moving the proximate valve end of the valve 930 distal from the sidewall of the exhaust conduit.

Figure 5A:
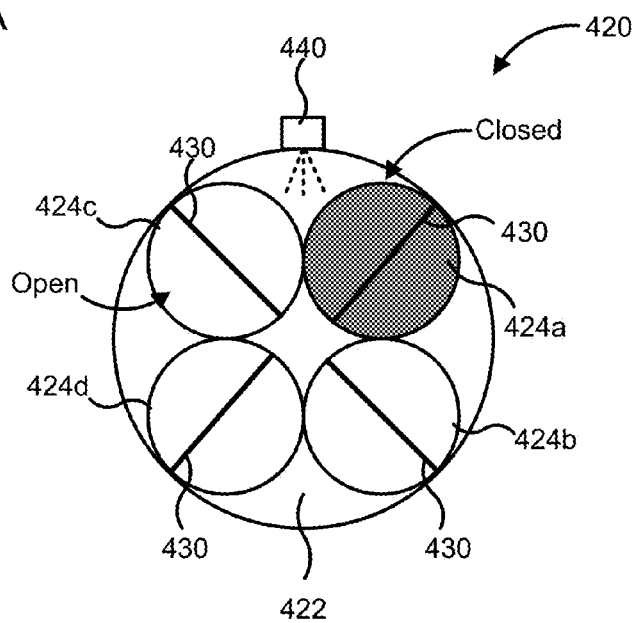
FIG. 5A is a front view of an exhaust conduit according to still another embodiment.
Figure 5B:
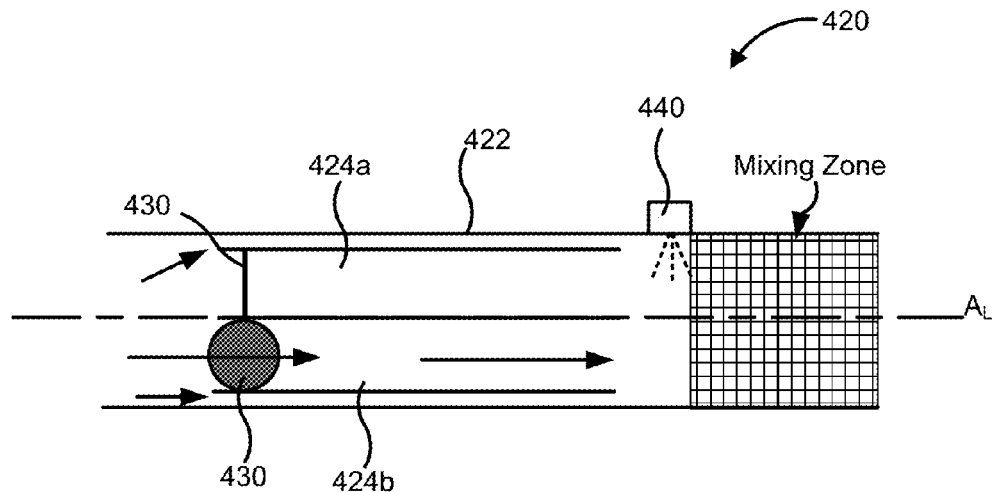
FIG. 5B is a side cross-section view of the exhaust conduit of FIG. 5A with one valve of a plurality of valves included in the exhaust conduit closed.

FIG. 5A is a front view and FIG. 5B is side cross-section view of yet other embodiment of an exhaust conduit 420. The exhaust conduit 420 can be used in any aftertreatment system, for example the aftertreatment system 100 and is structured to allow adjustment of a flow velocity of an exhaust gas flowing therethrough.

The exhaust conduit 420 includes a first channel 424a, a second channel 424b, a third channel 424c and a fourth channel 424d (collectively referred to herein as "the plurality of channels 424") positioned within an internal volume 422 defined by the exhaust conduit 420. As shown in FIG. 5A, the plurality of channels 424 are positioned in a radial array around a longitudinal axis $A_L$ of the exhaust conduit 420 (FIG. 5B). FIG. 5A shows the exhaust conduit 420 and each of the plurality of channels 424 as having a circular cross-section. In other embodiments, the exhaust conduit 420 and each of the plurality of channels 424 can have any suitable cross-section, for example square, rectangular, oval, elliptical, polygonal or any other suitable cross-section. Furthermore, each of the plurality of channels 424 can have the same cross-sectional area or different cross-sectional areas. Moreover, FIG. 5A shows four channels 424 positioned in the internal volume 422 but in other implementations, any number of channels can be positioned in the internal volume 422.

A reductant insertion unit 440 (e.g., an injector) is positioned downstream of the valve 330 and configured to insert a reductant (e.g., an aqueous urea solution) into the exhaust gas flow. A valve 430 is positioned at an inlet of each of the plurality of channels 424. The valves 430 can be selectively closed or opened to allow the exhaust gas to selectively flow through one or more of the plurality of channels 424, thereby adjusting an exhaust gas flow velocity based on an initial flow velocity of the exhaust gas, as described before herein. The valves 430 can include any suitable valves, for example a butterfly valve, which can be actuated via automated actuators or manually. When all the valves 430 are open, the cross-sectional area of the exhaust conduit 420 includes the sum of the cross-sectional area of each of the plurality of channels 424, and the portion of the internal volume 422 of the exhaust conduit 420 surrounding the plurality of channels 424.

One or more of the valves 430 can be selectively closed to adjust the cross-sectional area of the exhaust conduit 420. For example, as shown in FIG. 5A-B, the valve 430 positioned at an inlet of the first channel 424a is closed while the remaining valves 430 positioned at inlets of the second channel 424b, the third channel 424c and the fourth channel 424d are closed. In this configuration, the cross-sectional area of the exhaust conduit 420 includes the sum of the cross-sectional areas of the second channel 424b, the third channel 424c, the fourth channel 424d and the portion of the internal volume 422 of the exhaust conduit 420 surrounding the plurality of channels 424. The portion of the internal volume 422 surrounding the channels 424 can also serve as a safety mechanism to allow the exhaust gas to flow through the exhaust conduit 420 if all the valves 430 are closed, for example due to a malfunction. In other embodiments, the portion of the internal volume 422 can be closed (e.g., via insulation, welded plates, etc.) so that the exhaust gas can only flow through one or more of the plurality of channels 424 that have their valves 430 open.

Figure 6:
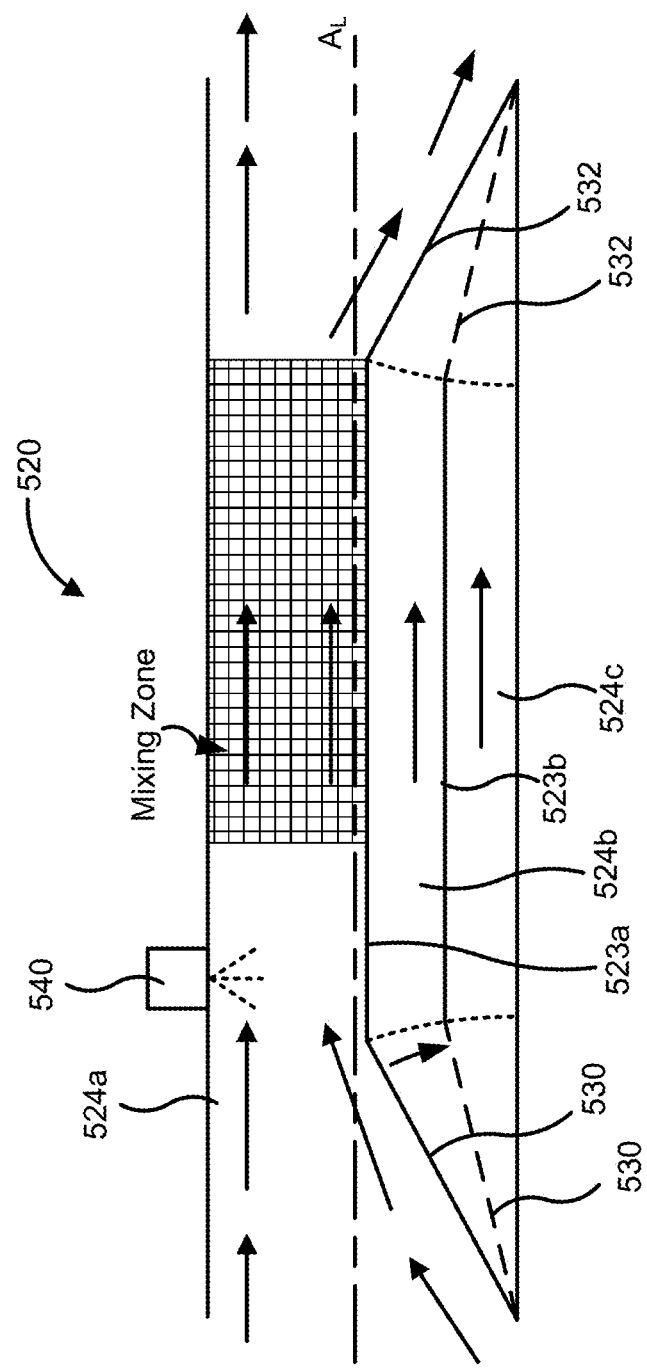
FIG. 6 is a side cross-section of yet another embodiment of an exhaust conduit that includes an inlet valve and an exit ramp.

FIG. 6 is a side cross-section of another embodiment of an exhaust conduit 520. The exhaust conduit 520 can be used in any aftertreatment system, for example the aftertreatment system 100 and is structured to allow adjustment of a flow velocity of an exhaust gas flowing therethrough.

The exhaust conduit 520 includes a first sidewall 523a positioned within an inner volume defined by the exhaust conduit 520. The first sidewall 523a is positioned parallel to a longitudinal axis $A_L$ of the exhaust conduit 520. A second sidewall 523b is also positioned within the internal volume defined by the exhaust conduit 520. The second sidewall 523b is positioned parallel to the longitudinal axis $A_L$ of the exhaust conduit 520 opposite the first sidewall 523a. The first sidewall 523a and the second sidewall 523b divide the exhaust conduit 520 into a first channel 524a positioned at the center of the exhaust conduit 320, a second channel 524b positioned parallel to the first channel 524a, and a third channel 524c also positioned parallel to the second channel 524b. That is the first sidewall 523a and the second sidewall 523b divide the exhaust conduit 520 into three parallel channels, similar to the exhaust conduit 320 as described before herein. The first channel 524a defines a first cross-sectional area. The second channel 524b defines a second cross-sectional area which can be the same or different than the first cross-sectional area. The third channel 524c defines a third cross-sectional area which can be equal to or different than the first cross-sectional area and/or the second cross-sectional area.

A valve 530 is positioned at an inlet of the second channel 524b and the third channel. The valve 530 can include a sliding valve or check valve. A reductant insertion unit 540 (e.g., an injector) is positioned downstream of the valve 530 and configured to insert a reductant (e.g., an aqueous urea solution) into the exhaust gas flow. As shown in FIG. 6, the valve 330 is inclined at an angle with respect to a first channel inlet of the first channel 324a and the second channel (e.g., at an angle of about 25, 30, 35, 40, 45, 50, 55, 60, 65, 70 or 75 degrees). The angled valve 530 is structured to direct the flow of the exhaust gas towards the first channel 524a and/or the second channel 524b, thereby allowing smooth transition of the exhaust gas from the initial cross-sectional area of the exhaust conduit 520 at an inlet of the exhaust conduit 520, to the first cross-sectional area of the first channel 524a and/or the second cross-sectional area of the second channel 524b, as described herein. The valve 530 can be similar in structure and function to the valve 330 described with respect to the exhaust conduit 320 and therefore, not described in further detail herein.

A ramp 532 is positioned at an outlet of the exhaust conduit 520. The ramp 532 is structured to allow a smooth flow transition of the exhaust gas from the first channel 524a and/or second channel 524b of the exhaust conduit 520 when the valve 530 is closed. For example, when valve 530 is completely open, the exhaust gas flows through each of the first channel 524a, the second channel 524b and the third channel 524c. In this configuration, the ramp 532 is also completely open, for example oriented parallel to a longitudinal axis $A_L$ of the exhaust conduit 520.

In response to the valve 530 being partially closed to block the exhaust gas flow through the third channel 524c, the ramp 532 is inclined at a first angle so that a proximate end of the ramp 532 proximate to the second channel 524b is aligned with, in contact with, or otherwise proximate to a distal end of the second sidewall 523b distal from the inlet of the exhaust conduit 520. This allows smooth flow transition of the exhaust gas exiting the first channel 524a and the second channel 524b towards the outlet of the exhaust conduit 520. Similarly, if the valve 530 is completely closed, that is blocking the exhaust gas flow to each of the second channel 524b and the third channel 524c, the ramp 532 is inclined at a second angle greater than the first angle so that the proximate end of the ramp proximate is aligned with, in contact with, or otherwise proximate to a distal end of the first sidewall 523a distal from the inlet of the exhaust conduit. In this manner, the ramp 532 can allow smooth flow transition of the exhaust gas flowing only through the first channel 524a towards the outlet of the exhaust conduit 520.

In various embodiments, the ramp 532 is spring loaded and hinged proximate to the outlet of the exhaust conduit 520. The springs or any other biasing member can be structured to allow the ramp 532 to progressively rotate by pivoting about a hinge so that the inclination angle of the ramp 532 is increased or reduced, corresponding to an opening or closing of the valve 530. For example, the ramp 532 can be communicatively coupled to the valve 530 in a feedback loop (e.g., via a controller such as the controller 170) so that opening or closing of the valve 530 leads to a corresponding increase or decrease in the inclination angle of the ramp 532, as described herein.

Figure 7:
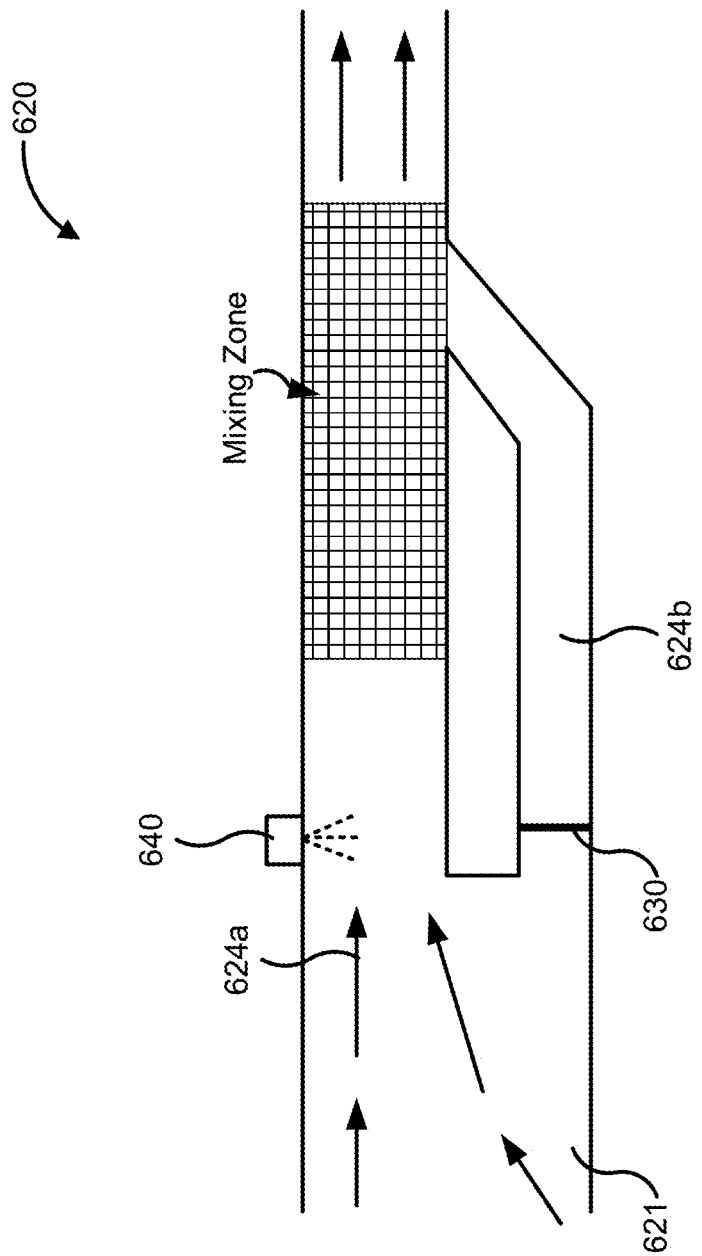
FIG. 7 is a side cross-section of a particular embodiment of an exhaust conduit that can be included in an aftertreatment system, which uses a single or plurality of bypass conduits (similar to a wastegate) to moderate flow through various regions of the exhaust conduit.

FIG. 7 is a side cross-section view of yet another embodiment of an exhaust conduit 620. The exhaust conduit 620 can be used in any aftertreatment system, for example the aftertreatment system 100 and is structured to allow adjustment of a flow velocity of an exhaust gas flowing therethrough.

The exhaust conduit 620 includes a first channel 624a and a second channel 624b positioned parallel to the first channel 624a. The second channel 624b is fluidly coupled to the first channel 624a proximate to an outlet of the exhaust conduit 620. A reductant insertion unit 640 (e.g., an injector) is positioned on a sidewall of the first channel 624a and configured to insert a reductant (e.g., an aqueous urea solution) into the exhaust gas flow. The first channel 624a has a first cross-sectional area and the second channel 624b has a second cross-sectional area, each of the which is smaller than an inlet cross-sectional area of the inlet 621 of the exhaust conduit 620.

A valve 630 is positioned proximate to an inlet of the second channel 624b. The valve 630 can include any suitable valve, for example a butterfly valve, a gate valve, a check valve (e.g., a tilting disc check valve, a swing check valve, an axial check valve, etc.), a ball valve, a spring loaded valve or any other valve. In various embodiments, the valve 630 can include a waste gate type valve operated via pneumatic or hydraulic actuators. The valve 630 is structured to selectively open or close to adjust a cross-sectional area of the exhaust conduit 620 by allowing the exhaust gas to flow through only the first channel 624a when the valve 630 is closed or through each of the first channel 624a and the second channel 624b when the valve 630 is open.

In operation, the valve 630 can be initially closed so that the exhaust gas flows through only the first channel 624a, and experiences an increase in the exhaust flow velocity relative to an initial flow velocity of the exhaust gas. This can be particularly suitable, for example, during a startup or idling condition of the engine during which the initial flow velocity of the exhaust gas is low, for example below a predetermined threshold. Since the first cross-sectional area of the first channel 624a is smaller than the inlet cross-sectional area of the inlet 621, the exhaust gas experiences an increase in the exhaust gas flow velocity as it flows through the first channel 624a.

As the initial flow velocity of the exhaust gas increases, for example rises above a predetermined threshold (e.g., determined from a lookup table stored in a memory of a controller such as the memory 174 of the controller 170), the valve 630 opens to allow the exhaust gas to also flow through the second channel 624b as well. Thus, the cross-sectional area of the exhaust conduit 620 is selectively adjustable based on the initial flow velocity of the exhaust gas.

Figure 8:
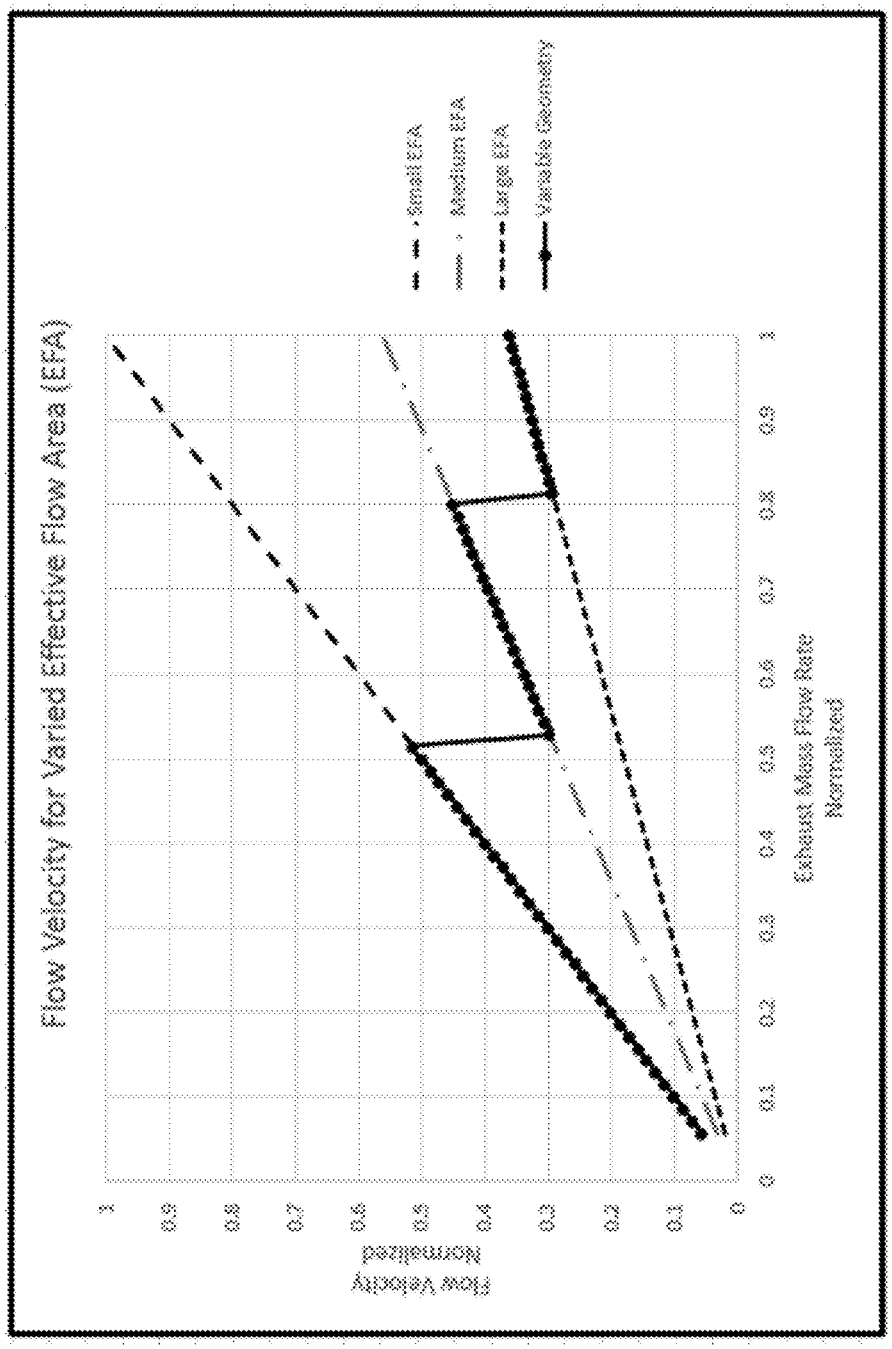
FIG. 8 is a plot of exhaust flow velocity vs exhaust flow rate of an exhaust gas flowing through various fixed effective flow area pipes and a variable effective flow area exhaust pipe.
Figure 9:
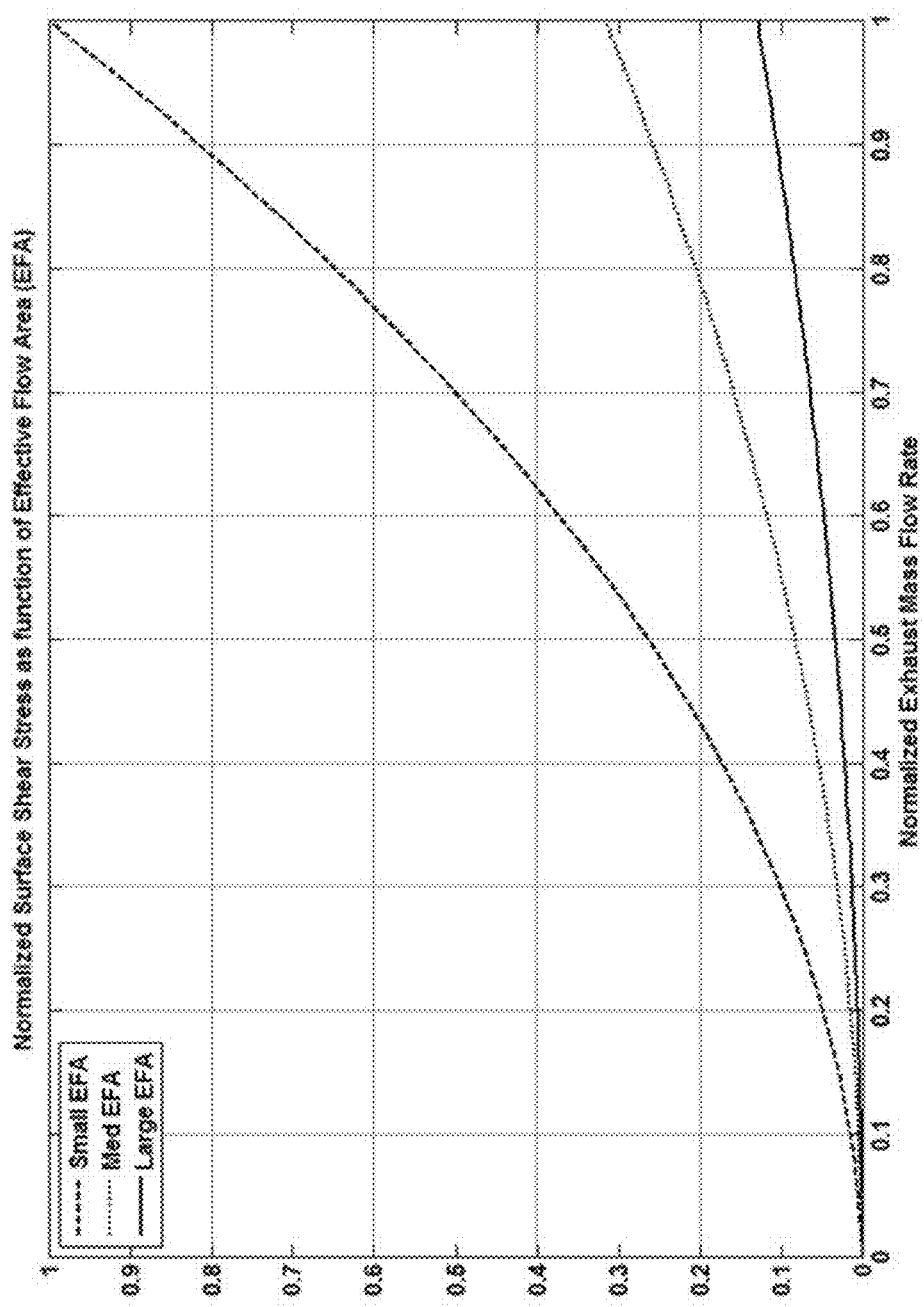
FIG. 9 is a plot of shear stress exerted on sidewalls at various exhaust flow rates of an exhaust gas flowing through various fixed effective flow area exhaust pipes.

FIG. 8 is a plot of exhaust flow velocity vs exhaust flow rate (i.e., mass flow rate) through various fixed effective flow area (EFA) exhaust pipes and a variable geometry exhaust pipe and FIG. 9 is the shear stress on a wall of the fixed EFA exhaust pipes. The small EFA pipe experiences the highest increase in exhaust flow velocity with an increase in the exhaust mass flow rate which corresponds to a higher shear stress on the wall of the small EFA diameter pipe relative to the medium and large EFA pipes (FIG. 9). Therefore, the small EFA pipe is suitable for causing the exhaust gas at low flow rates to produce sufficient shear stress on the sidewalls of the small EFA pipe to shear away or remove reductant pools or deposits from the sidewalls of the pipe.

However, at higher exhaust flow velocities corresponding to higher exhaust flow rates, the exhaust temperature, back pressure and/or shear stress on the sidewalls of the small EFA pipe can become substantially high, which can damage the small EFA pipe, aftertreatment components, or affect engine performance. On the other hand, the larger EFA pipes do not cause the exhaust gas to generate sufficient velocity and shear stress at the lower exhaust gas mass flow rates which can allow reductant deposits to form on the sidewalls of the larger diameter pipes at the lower exhaust flow rates due to lower exhaust flow velocities at the low mass flow rates.

In contrast, the variable diameter exhaust pipe allows adjustment of the exhaust flow velocity and thereby the shear stress on the sidewalls of the exhaust pipe based on the initial flow rate or otherwise initial flow velocity of the exhaust pipe. The diameter of the variable diameter exhaust pipe can be reduced at low exhaust mass flow rates and increased at high exhaust gas mass flow rates to maintain a sufficient shear stress on sidewalls of the exhaust pipe, for example within a predetermined range irrespective of the initial flow velocity of the exhaust gas.

Figure 10:
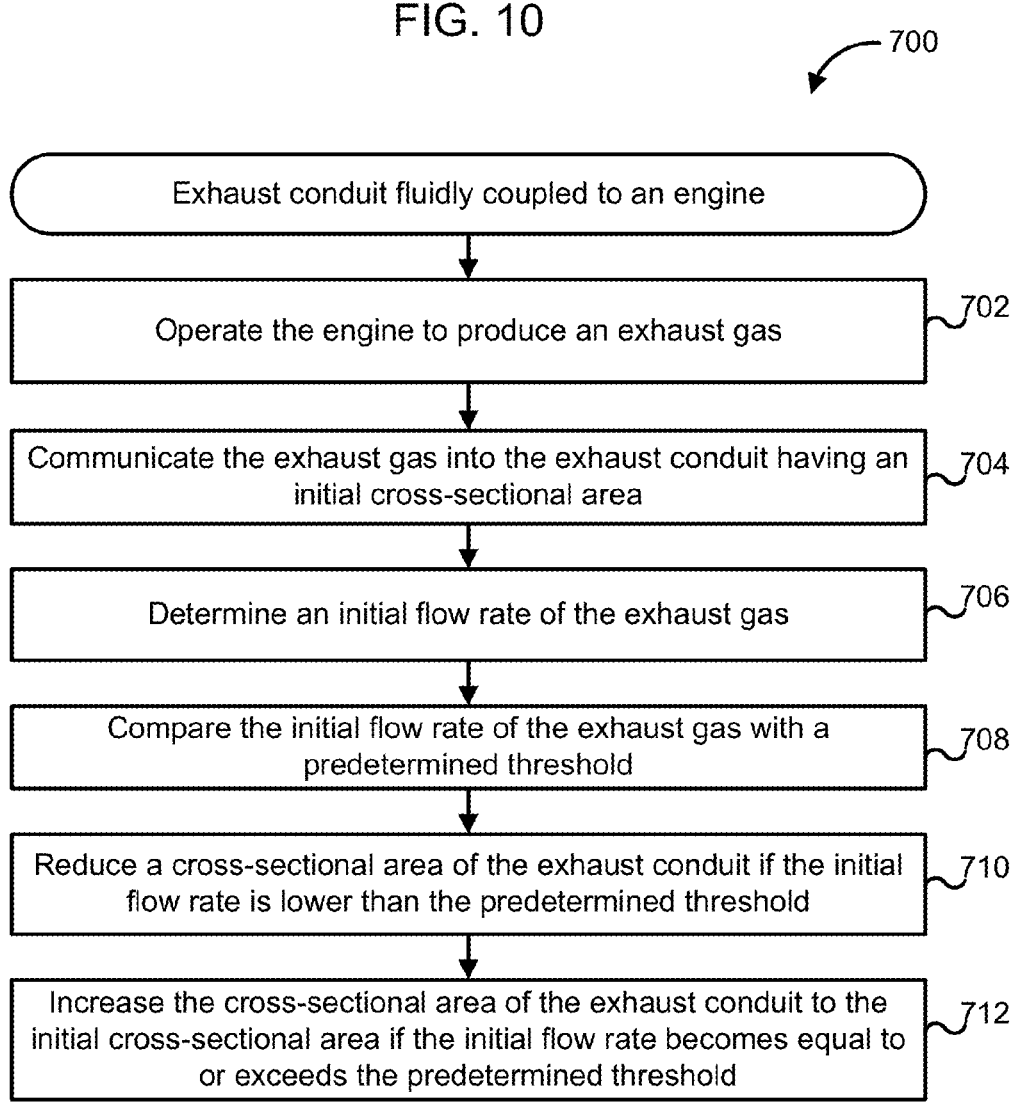
FIG. 10 is a schematic flow diagram of an embodiment of a method of reducing reductant deposits within an aftertreatment system by adjusting a flow velocity of the exhaust conduit flowing through the exhaust conduit via adjusting a cross-sectional area of the exhaust conduit.

FIG. 10 is a schematic flow diagram of an example method 700 for adjusting a flow velocity of an exhaust gas flow through an exhaust conduit (e.g., the exhaust conduit 120, 220, 320, 420, 520, 620 or any other exhaust conduit described herein) fluidly coupled to an engine (e.g., an engine 10). The operations of the method 700 can be stored in the form of instructions on a non-transitory CRM (e.g., the memory 174 of the controller 170, or main memory 836, read only memory (ROM) 838 or storage device 840 included in the computing device 830 of FIG. 11). The CRM can be included in a computing device (e.g., the computing device 830) which is configured to execute the instructions stored on the CRM to perform the operations of the method 700.

The method 700 includes operating the engine to produce an exhaust gas at 702. For example, the engine 10 is operated to produce the exhaust gas, for example a diesel exhaust gas. The exhaust gas is communicated into the exhaust conduit which has an initial cross-sectional area at 704. For example, the exhaust conduit can include the exhaust conduit 120, 220, 320, 420, 520, 620 or any other exhaust conduit described herein which have an initial cross-sectional area.

An initial flow rate (e.g. mass flow rate) of the exhaust conduit is determined at 706. The initial flow rate of the exhaust gas increases or decreases based on an operating condition of the engine. For example, the flow rate sensor 134 (e.g., a physical or virtual flow rate sensor as described herein) determines the initial flow rate and/or velocity of the exhaust gas which can be low at engine 10 startup or idling conditions, and relatively higher during normal operation or acceleration.

The initial flow rate of the exhaust gas is compared with a predetermined threshold at 708. For example, the controller 170 compares the initial flow rate of the exhaust gas with the predetermined threshold. The predetermined threshold can correspond to a flow rate above which the initial flow velocity exerts a sufficient shear stress on the sidewalls of the exhaust conduit to prevent solid reductant deposits or reductant pools from accumulating on the sidewalls of the exhaust conduit or the components of the aftertreatment system.

If the initial flow rate is less than a predetermined threshold, a cross-sectional area of the exhaust conduit is reduced at 710. For example, the cross-section adjusting mechanism 130 reduces the cross-sectional area of the exhaust conduit 120. Reducing of the cross-sectional area of the exhaust conduit causes the exhaust gas to have an adjusted flow velocity greater than the initial flow velocity. The exhaust gas at the adjusted flow velocity exerts a shear stress on inner surfaces of the exhaust conduit (e.g., the exhaust conduit 120, 220 or any other shear conduit described herein) to shear off any reductant pools or reductant deposits from inner surfaces of the exhaust conduit. Moreover, reducing the cross-sectional area of the exhaust conduit can cause the shear stress to be maintained within a predetermined range irrespective of the initial flow rate of the exhaust gas.

In various embodiments, if the initial flow rate (e.g. mass flow rate) of the exhaust gas becomes equal to or exceeds the predetermined threshold, the cross-sectional area of the exhaust conduit is increased at 712. This causes the exhaust gas to have an adjusted flow velocity equal to or different than the initial flow velocity. Any suitable exhaust conduit can be used to achieve the increase or decrease in the cross-sectional area of the exhaust conduit, for example the exhaust conduit 120, 220, 320, 420, 520 or 620 as described herein. In some embodiments, the exhaust conduit includes a plurality of channels defined within the exhaust conduit. Each of the plurality of channels is structured to allow at least a portion of the exhaust gas to pass therethrough so that the initial cross-sectional area of the exhaust conduit corresponds to a sum of the cross-sectional area of each of the plurality of channels.

In such embodiments, reducing the cross-sectional area of the exhaust conduit includes closing at least one valve positioned on an inlet of at least one of the plurality of channels. This causes the exhaust gas to flow through only a portion of the plurality of channels so that the exhaust conduit has a reduced cross-sectional area corresponding to a sum of the cross-sectional areas of the portion of the plurality of channels. Examples of such exhaust conduits include the exhaust conduit 220, 320, 420, 520 and 620 described in detail herein. In particular embodiments, the plurality of channels are positioned in a radial array around a longitudinal axis of the exhaust conduit, and at least one valve is positioned at an inlet of each of the plurality of channels, as described in detail with respect to the exhaust conduit 420.

Figure 11:
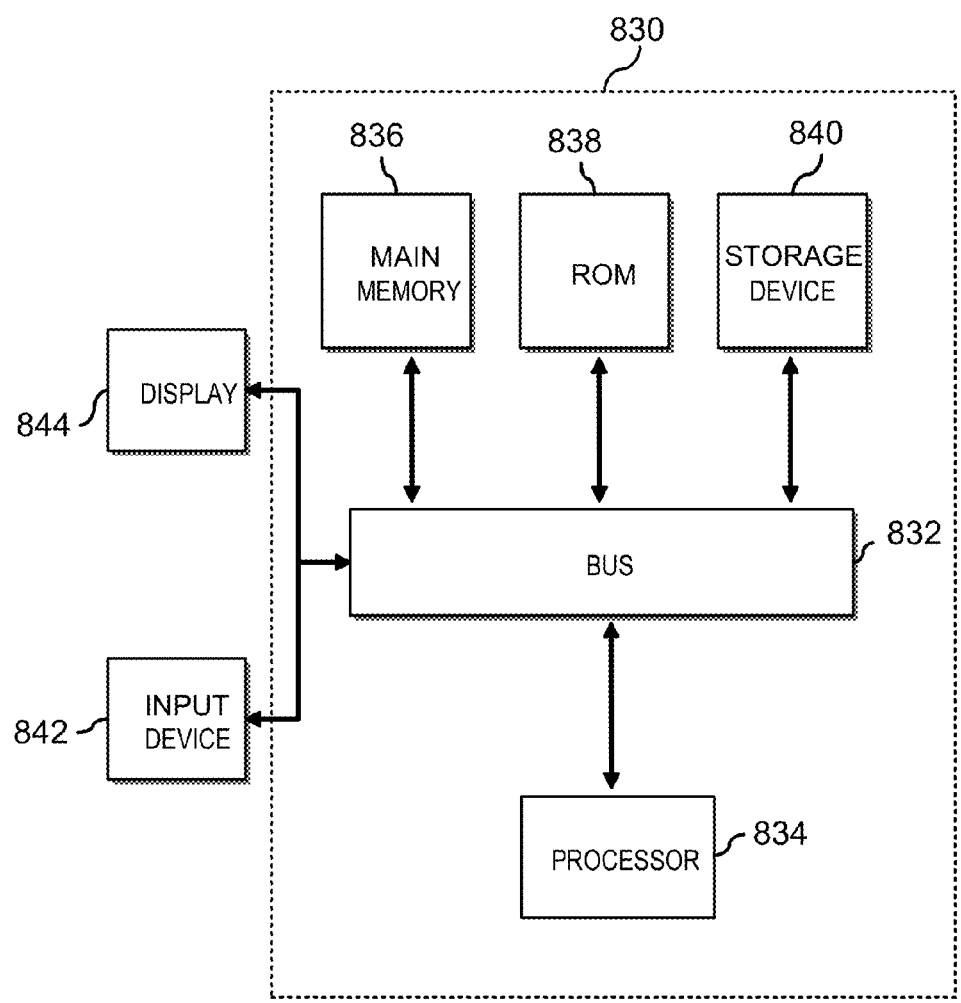
FIG. 11 is a schematic block diagram of computing device that can be used as the controller of FIG. 1 and/or FIG. 2.

In some embodiments, the controller 170, the control circuitry 171 or any of the controller or control circuitries described herein can comprise a system computer of an apparatus or system which includes the aftertreatment system 100 (e.g., a vehicle, an engine or generator set, etc.). For example, FIG. 11 is a block diagram of a computing device 830 in accordance with an illustrative implementation. The computing device 830 can be used to perform any of the methods or the processes described herein, for example the method 700. In some embodiments, the controller 170 can include the computing device 830. The computing device 830 includes a bus 832 or other communication component for communicating information. The computing device 830 can also include one or more processors 834 or processing circuits coupled to the bus for processing information.

The computing device 830 also includes main memory 836, such as a random access memory (RAM) or other dynamic storage device, coupled to the bus 832 for storing information, and instructions to be executed by the processor 834. Main memory 836 can also be used for storing position information, temporary variables, or other intermediate information during execution of instructions by the processor 834. The computing device 830 may further include ROM 838 or other static storage device coupled to the bus 832 for storing static information and instructions for the processor 834. A storage device 840, such as a solid-state device, magnetic disk or optical disk, is coupled to the bus 832 for persistently storing information and instructions. For example instructions for determining the initial flow rate (e.g., using various operational parameters of the engine or exhaust gas, as described herein), initial flow velocity (based on initial flow rate), and comparing the initial flow rate to the predetermined threshold and increasing or decreasing the cross-sectional area of the exhaust conduit corresponding thereto can be stored on the storage device 840.

The computing device 830 may be coupled via the bus 832 to a display 835, such as a liquid crystal display, or active matrix display, for displaying information to a user. An input device 842, such as a keyboard or alphanumeric pad, may be coupled to the bus 832 for communicating information and command selections to the processor 834. In another implementation, the input device 842 has a touch screen display 844.

According to various implementations, the processes and methods described herein can be implemented by the computing device 830 in response to the processor 834 executing an arrangement of instructions contained in main memory 836 (e.g., the operations of the method 700). Such instructions can be read into main memory 836 from another non-transitory computer-readable medium, such as the storage device 840. Execution of the arrangement of instructions contained in main memory 36 causes the computing device 830 to perform the illustrative processes described herein. One or more processors in a multi-processing arrangement may also be employed to execute the instructions contained in main memory 836. In alternative implementations, hardwired circuitry may be used in place of or in combination with software instructions to effect illustrative implementations. Thus, implementations are not limited to any specific combination of hardware circuitry and software.

Although an example computing device has been described in FIG. 11, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, conduit routing, valve actuation, valve design, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for reducing reductant deposits in an exhaust conduit fluidly coupled to an engine, the method comprising:
   operating the engine to produce an exhaust gas;
   communicating the exhaust gas into the exhaust conduit, wherein the exhaust conduit has an initial cross-sectional area and comprises a plurality of channels having a plurality of respective cross-sectional areas, each of the plurality of channels defined within the exhaust conduit and structured to allow at least a portion of the exhaust gas to pass therethrough, the initial cross-sectional area of the exhaust conduit corresponding to a sum of the cross-sectional area of each of the plurality of channels;
   determining, by interpreting an output signal from a flow rate sensor positioned proximate to an inlet of the exhaust conduit, an initial flow rate of the exhaust gas entering the exhaust conduit, the initial flow rate corresponding to an initial flow velocity of the exhaust gas entering the exhaust conduit, wherein the initial flow rate, and thereby the initial flow velocity of the exhaust gas,. increases or decreases based on an operating condition of the engine;
   comparing the initial flow rate of the exhaust gas with a predetermined threshold;
   if the initial flow rate of the exhaust gas is lower than the predetermined threshold, reducing the initial cross-sectional area of the exhaust conduit, the reducing of the initial cross-sectional area causing the exhaust gas to have an adjusted flow velocity greater than the initial flow velocity.

2. The method of claim 1, wherein the exhaust gas at the adjusted flow velocity exerts a shear stress on inner surfaces of the exhaust conduit to shear off any reductant pools or reductant deposits from inner surfaces of the exhaust conduit, and wherein the reducing the cross-sectional area of the exhaust conduit causes the shear stress to be maintained within a predetermined range irrespective of the initial flow rate of the exhaust gas.

3. The method of claim 1, further comprising:
   if the initial flow rate of the exhaust gas becomes equal to or exceeds the predetermined threshold, increasing the cross-sectional area of the exhaust conduit, the increasing of the cross- sectional area causing the exhaust gas to have an adjusted flow velocity equal to or different than the initial flow velocity.

4. The method of claim 1, wherein
   the reducing the initial cross-sectional area of the exhaust conduit includes closing a valve positioned on an inlet of at least one of the plurality of channels, the closing of the valve causing the exhaust gas to flow through only a portion of the plurality of channels so that the exhaust conduit has a reduced cross-sectional area corresponding to a sum of the cross-sectional areas of the portion of the plurality of channels.

5. The method of claim 4, wherein the plurality of channels are positioned in a radial array around a longitudinal axis of the exhaust conduit, and wherein the valve is positioned at an inlet of each of the plurality of channels.

6. The method of claim 1 wherein the exhaust conduit comprises:
   a first sidewall positioned within an inner volume defined by the exhaust conduit, the first sidewall positioned parallel to a longitudinal axis of the exhaust conduit, the first sidewall dividing the exhaust conduit into:
      a first channel of the plurality of channels, the first channel having a first cross-sectional area, and
      a second channel of the plurality of channels, the second channel parallel to the first channel and having a second cross-sectional area; and
   wherein the initial cross-sectional area of the exhaust conduit includes the first cross-sectional area of the first channel and the second cross-sectional area of the second channel, and wherein reducing the initial cross-sectional area of the exhaust conduit includes closing a first valve positioned at the inlet of the second channel, the closing of the first valve causing the initial cross-sectional area to be reduced to include only the first cross-sectional area.

7. The method of claim 6, wherein the method further includes:
   if the initial flow rate of the exhaust gas becomes equal to or exceeds the predetermined threshold, increasing the cross-sectional area of the exhaust conduit,
   wherein the increasing of the cross-sectional area includes opening the first valve to allow the exhaust gas to flow through each of the first channel and the second channel so that the exhaust gas has a second adjusted flow velocity in the first channel and the second channel equal to the initial flow velocity.

8. The method of claim 6, wherein the method further includes:
   if the initial flow rate of the exhaust gas becomes equal to or exceeds the predetermined threshold, increasing the cross-sectional area of the exhaust conduit, wherein the increasing of the cross-sectional area includes opening the first valve to allow the exhaust gas to flow through each of the first channel and the second channel so that the exhaust gas has a second adjusted flow velocity in the first channel and the second channel different than the initial flow velocity.

9. The method of claim 1, further comprising:
   a ramp positioned at an outlet of the second channel, the ramp structured to provide smooth flow transition of the exhaust gas from the first channel to an outlet of the exhaust conduit when the first valve is closed.

10. A method for reducing reductant deposits in an exhaust conduit fluidly coupled to an engine, the exhaust conduit comprising:
    a first sidewall positioned within an inner volume defined by the exhaust conduit, the first sidewall positioned parallel to a longitudinal axis of the exhaust conduit, the first sidewall dividing the exhaust conduit into a first channel having a first cross-sectional area and a second channel parallel to the first channel and having a second cross-sectional area, and
    a second sidewall positioned within the inner volume defined by the exhaust conduit, the second sidewall positioned parallel to the longitudinal axis of the exhaust conduit opposite the first sidewall, the second sidewall dividing the exhaust conduit into a third channel parallel to the first channel and having a third cross-sectional area, the method comprising:
  operating the engine to produce an exhaust gas;
  communicating the exhaust gas into the exhaust conduit, wherein the exhaust conduit has an initial cross-sectional area;
  determining an initial flow rate of the exhaust gas entering the exhaust conduit, the initial flow rate corresponding to an initial flow velocity of the exhaust gas entering the exhaust conduit, wherein the initial flow rate, and thereby the initial flow velocity of the exhaust gas, increases or decreases based on an operating condition of the engine;
  comparing the initial flow rate of the exhaust gas with a predetermined threshold;
  if the initial flow rate of the exhaust gas is lower than the predetermined threshold, reducing a cross-sectional area of the exhaust conduit, the reducing of the cross-sectional area causing the exhaust gas to have an adjusted flow velocity greater than the initial flow velocity;
wherein the initial cross-sectional area of the exhaust conduit includes a sum of the first cross-sectional area of the first channel, the second cross-sectional area of the second channel and the third cross-sectional area of the third channel, and wherein reducing the initial cross-sectional area of the exhaust conduit includes closing a first valve positioned at the inlet of the second channel, and a second valve positioned at an inlet of the third channel, the closing of the first valve and the second valve causing the initial cross-sectional area to be reduced to include only the first cross-sectional area.

11. An exhaust aftertreatment system, comprising:
a selective catalytic reduction configured to decompose constituents of an exhaust gas generated by an engine;
an exhaust conduit fluidly coupled to the engine and the selective catalytic reduction system, the exhaust conduit defining a cross-sectional area and comprising a plurality of channels having a plurality of respective cross-sectional areas, each of the plurality of channels defined within the exhaust conduit and structured to allow at least a portion of the exhaust gas to pass therethrough, the cross-sectional area of the exhaust conduit corresponding to a sum of the cross-sectional area of each of the plurality of channels, the exhaust conduit structured to receive the exhaust gas at an initial flow rate, the initial flow rate corresponding to an initial flow velocity of the exhaust gas entering the exhaust conduit, the initial flow rate, and thereby the initial flow velocity of the exhaust gas, increasing or decreasing based on an operating condition of the engine;
a cross-section adjusting valve operatively coupled to the exhaust conduit, the cross-section adjusting valve configured to increase or decrease the cross-sectional area of the exhaust conduit in response to determining, by interpreting an output signal from a flow rate sensor positioned proximate to an inlet of the exhaust conduit, the initial flow rate of the exhaust conduit, the increase or decrease of the cross-sectional area changing the initial flow velocity to an adjusted flow velocity different from the initial flow velocity; and
a reductant insertion assembly fluidly coupled to the exhaust conduit and configured to selectively insert a reductant into the exhaust conduit.

12. The aftertreatment system of claim 11, wherein the cross-section adjusting valve is positioned at an inlet of at least one of the plurality of channels, and the aftertreatment system further comprising:
  a flow rate sensor positioned proximate to an inlet of the exhaust conduit; and
  a controller
  configured to:
    interpret an output signal from the flow rate sensor indicative of the initial flow velocity of the exhaust gas,
    compare the initial flow rate of the exhaust gas with a predetermined threshold, the initial flow rate indicative of an initial flow velocity of the exhaust gas entering the exhaust conduit, and
    if the initial flow rate is lower than the predetermined threshold, instruct the valve to move into a closed position to close an inlet of at least one of the plurality of channels, the closing of the valve causing the exhaust gas to flow through only a portion of the plurality of channels so that the exhaust conduit has a reduced cross-sectional area corresponding to a sum of the cross-sectional areas of the portion of the plurality of channels.

13. The aftertreatment system of claim 12, wherein the plurality of channels are positioned in a radial array around a longitudinal axis of the exhaust conduit, and wherein the at valve is positioned at an inlet of each of the plurality of channels.

14. The aftertreatment system of claim 12, wherein the exhaust conduit further comprises a ramp positioned at an outlet of the second channel, the ramp structured to provide smooth flow transition of the exhaust gas from the first channel to an outlet of the exhaust conduit when the first valve is closed.

15. The aftertreatment system of claim 11, wherein the exhaust conduit further comprises:
  a first sidewall positioned within an inner volume defined by the exhaust conduit, the first sidewall positioned parallel to a longitudinal axis of the exhaust conduit, the first sidewall dividing the exhaust conduit into:
    a first channel of the plurality of channels, the first channel having a first cross-sectional area, and
    a second channel of the plurality of channels, the second channel parallel to the first channel and having a second cross-sectional area.

16. The aftertreatment system of claim 15, wherein the valve is a first valve positioned at a second channel inlet of the second channel, wherein the initial cross-sectional area of the exhaust conduit includes the first cross-sectional area of the first channel and the second cross-sectional area of the second channel, and wherein reducing the initial cross-sectional area of the exhaust conduit includes closing the first valve so that the initial cross-sectional area is reduced to include only the first cross-sectional area.

17. The aftertreatment system of claim 16, wherein the controller is further configured to:
  if the initial flow rate of the exhaust gas becomes equal to or exceeds the predetermined threshold, instructing the first valve to move into an open position, the opening of the first valve allowing the exhaust gas to flow through each of the first channel and the second channel so that the exhaust gas has a second adjusted flow velocity in the first channel and the second channel equal to the initial flow velocity.

18. The aftertreatment system of claim 16, wherein the exhaust conduit further comprises:

a second sidewall positioned within the inner volume defined by the exhaust conduit, the second sidewall positioned parallel to the longitudinal axis of the exhaust conduit opposite the first sidewall, the second sidewall dividing the exhaust conduit into a third channel of the plurality of channels, the third channel parallel to the first channel and having a third cross-sectional area; and wherein the valve also includes a second valve positioned at a third channel inlet of the third channel, the second valve moveable between an open position and a closed position, and wherein the initial cross-sectional area of the exhaust conduit includes a sum of the first cross-sectional area of the first channel, the second cross-sectional area of the second channel and the third cross-sectional area of the third channel, and wherein reducing the initial cross-sectional area of the exhaust conduit includes closing the first valve and the second valve so that the initial cross-sectional area is reduced to include only the first cross-sectional area.

19. An apparatus for delivering an exhaust gas generated by an engine to an aftertreatment component, comprising:
an exhaust conduit configured to be fluidly coupled to the engine and the aftertreatment component, a plurality of channels defined within the exhaust conduit, each of the plurality of channels structured to allow at least a portion of the exhaust gas to pass therethrough, an initial cross-sectional area of the exhaust conduit corresponding to a sum of the cross-sectional area of each of the plurality of channels, the exhaust conduit structured to receive the exhaust gas at an initial flow rate, the initial flow rate corresponding to an initial flow velocity of the exhaust gas entering the exhaust conduit, the initial flow rate, and thereby the initial flow velocity of the exhaust gas, increasing or decreasing based on an operating condition of the engine;
a flow rate sensor positioned proximate to an inlet of the exhaust conduit;
a valve positioned on an inlet of at least one of the plurality of channels; and
a controller communicatively coupled to the flow rate sensor and the valve, the controller configured to:
interpret an output signal from the flow rate sensor, the output signal indicative of the initial flow velocity of the exhaust gas, and
if the initial flow rate is lower than the predetermined threshold, instruct the valve to move into a closed position to close an inlet of at least one of the plurality of channels, the closing of the valve causing the exhaust gas to flow through only a portion of the plurality of channels so that the exhaust conduit has a reduced cross-sectional area corresponding to a sum of the cross-sectional areas of the portion of the plurality of channels.

20. The apparatus of claim 19, wherein the plurality of channels are positioned in a radial array around a longitudinal axis of the exhaust conduit, and wherein the valve is positioned at an inlet of each of the plurality of channels.

21. The apparatus of claim 19, wherein the plurality of channels include:
a first channel having a first cross-sectional area, and
a second channel parallel to the first channel, the second channel having a second cross-sectional area, the second channel separated from the first channel via a first sidewall; and
wherein the at valve is a first valve positioned at a second channel inlet of the second channel, and wherein the initial cross-sectional area of the exhaust conduit includes the first cross-sectional area of the first channel and the second cross-sectional area of the second channel, and wherein reducing the initial cross-sectional area of the exhaust conduit includes closing the first valve so that the initial cross-sectional area is reduced to include only the first cross-sectional area.

22. The apparatus of claim 21, wherein the controller is further configured to:
if the initial flow rate of the exhaust gas becomes equal to or exceeds the predetermined threshold, instruct the first valve to move into an open position, the opening of the first valve allowing the exhaust gas to flow through each of the first channel and the second channel so that the exhaust gas has a second adjusted flow velocity in the first channel and the second channel equal to the initial flow velocity.

23. The apparatus of claim 21, wherein the controller is further configured to:
if the initial flow rate of the exhaust gas becomes equal to or exceeds the predetermined threshold, instructing the first valve to move into an open position, the opening of the first valve allowing the exhaust gas to flow through each of the first channel and the second channel so that the exhaust gas has a second adjusted flow velocity in the first channel and the second channel different than the initial flow velocity.

24. The apparatus of claim 21, wherein the plurality of channels further include:
a third channel positioned parallel to the first channel and defining a third cross-sectional area, the third channel separated from the first channel by a second sidewall; and
a second valve positioned at a third channel inlet of the third channel,
wherein the initial cross-sectional area of the exhaust conduit includes a sum of the first cross-sectional area of the first channel, the second cross-sectional area of the second channel and the third cross-sectional area of the third channel, and wherein reducing the initial cross-sectional area of the exhaust conduit includes closing the first valve and the second valve so that the initial cross-sectional area is reduced to include only the first cross-sectional area.

25. A control circuitry comprising a controller, the controller comprising:
a flow rate sensing circuitry configured to interpret an output signal from a flow rate sensor, the flow rate sensor positioned proximate to an inlet of an exhaust conduit, the exhaust conduit comprising a plurality of channels having a plurality of respective cross-sectional areas, each of the plurality of channels defined within the exhaust conduit and structured to allow at least a portion of the exhaust gas to pass therethrough, the initial cross-sectional area of the exhaust conduit corresponding to a sum of the cross-sectional area of each of the plurality of channels, the output signal indicative of an initial flow rate of the exhaust gas, the initial flow rate corresponding to an initial flow velocity of the exhaust gas entering the exhaust conduit, and
a cross-section adjusting circuitry configured to:
communicate the exhaust gas into the exhaust conduit;
determine, by interpreting an output signal from the flow rate sensor, the initial flow rate of the exhaust gas entering the exhaust conduit, wherein the initial flow rate, and thereby the initial flow velocity of the exhaust gas, increases or decreases based on an operating condition of the engine;

compare the initial flow rate of the exhaust gas with a predetermined threshold; and if the initial flow rate of the exhaust gas is lower than the predetermined threshold, instruct the valve to move into a closed position to close an inlet of at least one of the plurality of channels, the moving the valve into the closed position causing the exhaust gas to flow through only a portion of the plurality of channels so that the exhaust conduit has a reduced cross-sectional area corresponding to a sum of the cross-sectional areas of the portion of the plurality of channels, causing the exhaust gas to have an adjusted flow velocity greater than the initial flow velocity;

wherein the exhaust conduit is fluidly coupled to an engine to receive an exhaust gas therefrom.

* * * * *